US008623973B1

(12) United States Patent
McDaniel et al.

(10) Patent No.: US 8,623,973 B1
(45) Date of Patent: Jan. 7, 2014

(54) ACTIVATOR SUPPORTS IMPREGNATED WITH GROUP VIII TRANSITION METALS FOR POLYMER PROPERTY CONTROL

(71) Applicant: Chevron Phillips Chemical Company LP, The Woodlands, TX (US)

(72) Inventors: Max P. McDaniel, Bartlesville, OK (US); Qing Yang, Bartlesville, OK (US); Tony R. Crain, Niotaze, KS (US); Kathy S. Collins, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/789,816

(22) Filed: Mar. 8, 2013

(51) Int. Cl.
*C08F 2/00* (2006.01)
*C08F 4/606* (2006.01)
*C08F 4/6192* (2006.01)
*C08F 4/646* (2006.01)
*C08F 4/70* (2006.01)
*C08F 2/38* (2006.01)
*C08F 10/02* (2006.01)

(52) U.S. Cl.
USPC ............ 526/86; 526/115; 526/117; 526/129; 526/156

(58) Field of Classification Search
USPC ........................... 526/86, 129, 156, 115, 117
See application file for complete search history.

(56) References Cited

U.S. PATENT DOCUMENTS

| | | | |
|---|---|---|---|
| 3,242,099 A | 3/1966 | Manyik |
| 3,248,179 A | 4/1966 | Norwood et al. |
| 4,501,885 A | 2/1985 | Sherk et al. |
| 4,588,790 A | 5/1986 | Jenkins, III et al. |
| 4,794,096 A | 12/1988 | Ewen |
| 4,808,561 A | 2/1989 | Welborn, Jr. et al. |
| 5,352,749 A | 10/1994 | DeChellis et al. |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 5,576,259 A | 11/1996 | Hasegawa et al. |
| 5,739,220 A | 4/1998 | Shamshoum et al. |
| 5,807,938 A | 9/1998 | Kaneko et al. |
| 5,919,983 A | 7/1999 | Rosen et al. |
| 6,107,230 A | 8/2000 | McDaniel et al. |
| 6,165,929 A | 12/2000 | McDaniel et al. |
| 6,239,235 B1 | 5/2001 | Hottovy et al. |
| 6,262,191 B1 | 7/2001 | Hottovy et al. |
| 6,262,196 B1 | 7/2001 | Mecking |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,524,987 B1 | 2/2003 | Collins et al. |
| 6,548,441 B1 | 4/2003 | McDaniel et al. |
| 6,548,442 B1 | 4/2003 | McDaniel et al. |
| 6,576,583 B1 | 6/2003 | McDaniel et al. |
| 6,613,712 B1 | 9/2003 | McDaniel et al. |
| 6,632,894 B1 | 10/2003 | McDaniel et al. |
| 6,667,274 B1 | 12/2003 | Hawley et al. |
| 6,750,302 B1 | 6/2004 | McDaniel et al. |
| 6,833,338 B2 | 12/2004 | McDaniel et al. |
| 6,833,415 B2 | 12/2004 | Kendrick et al. |
| 6,858,687 B2 | 2/2005 | McDaniel et al. |
| 7,041,617 B2 | 5/2006 | Jensen et al. |
| 7,226,886 B2 | 6/2007 | Jayaratne et al. |
| 7,294,599 B2 | 11/2007 | Jensen et al. |
| 7,517,939 B2 | 4/2009 | Yang et al. |
| 7,601,665 B2 | 10/2009 | McDaniel et al. |
| 7,619,047 B2 | 11/2009 | Yang et al. |
| 7,863,210 B2 | 1/2011 | Murray et al. |
| 7,884,163 B2 | 2/2011 | McDaniel et al. |
| 7,919,639 B2 | 4/2011 | Murray et al. |
| 8,012,900 B2 | 9/2011 | Murray et al. |
| 8,080,681 B2 | 12/2011 | Murray et al. |
| 8,207,280 B2 | 6/2012 | Murray et al. |
| 8,309,485 B2 | 11/2012 | Yang et al. |
| 8,501,654 B2 | 8/2013 | Murray et al. |
| 2004/0059070 A1 | 3/2004 | Whitte et al. |
| 2013/0029837 A1 | 1/2013 | Yang et al. |

FOREIGN PATENT DOCUMENTS

WO    WO 99/60033    11/1999

OTHER PUBLICATIONS

Li, et al., entitled "Coordination Copolymerization of Severely Encumbered Isoalkenes with Ethylene: Enhanced Enchainment Mediated by Binuclear Catalysts and Cocatalysts," *J. Am. Chem. Soc.*, 2005, 127, pp. 14756-14768.
*Modern Plastics Encyclopedia*, Mid-Nov. 1995 Issue, vol. 72, No. 12, 3 pages.
*Film Extrusion Manual—Process, Materials, Properties*, TAPPI Press, 1992, 16 pages.
C. A. Hieber and H. H. Chiang, entitled "Some Correlations Involving the Shear Viscosity of Polystyrene Melts," *Rheol. Acta*, 28:321-332 (1989).
C.A. Hieber and H.H. Chiang, entitled Shear-Rate-Dependence Modeling of Polymer Melt Viscosity, *Polym. Eng. & Sci.*, 32:931-938 (1992).
R. B. Bird, R. C. Armstrong and O. Hasseger, *Dynamics of Polymeric Liquids*, vol. 1, *Fluid Mechanics*, 2nd Edition, John Wiley & Sons (1987), 3 pages.
Hawley's Condensed Chemical Dictionary, 11th Ed., John Wiley & Sons, 1995, 3 pages.
Cotton et al., Advanced Inorganic Chemistry, 6th Ed., Wiley-Interscience, 1999, 4 pages.

*Primary Examiner* — Fred M Teskin
(74) *Attorney, Agent, or Firm* — Merchant & Gould P.C.

(57) ABSTRACT

Methods for controlling properties of an olefin polymer using a Group VIII transition metal-modified activator-support are disclosed. The melt index of the polymer can be decreased and the molecular weight of the polymer can be increased via the addition of the transition metal-modified activator-support to the polymerization reactor system.

27 Claims, No Drawings

US 8,623,973 B1

ACTIVATOR SUPPORTS IMPREGNATED WITH GROUP VIII TRANSITION METALS FOR POLYMER PROPERTY CONTROL

BACKGROUND OF THE INVENTION

There are various methods that can be employed to adjust or control the melt flow properties (such as melt index) and the molecular weight parameters (such as weight-average molecular weight) of an olefin polymer produced using a metallocene-based catalyst system. For instance, the metallocene compound and/or the polymerization reaction conditions can be changed to vary the melt flow properties and the molecular weight characteristics of the polymer that is produced. However, additional methods of adjusting or controlling the polymer properties are needed which do not require changes in the metallocene compound or the polymerization conditions. Accordingly, it is to this end that the present disclosure is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to olefin polymerizations and to processes and methods directed to controlling these olefin polymerization and the resultant properties of the olefin polymer. For example, aspects of the present invention are directed to an olefin polymerization process which can comprise contacting a catalyst composition with an olefin monomer and an optional olefin comonomer in a polymerization reactor system under polymerization conditions to produce an olefin polymer, wherein the catalyst composition can comprise a metallocene compound and a transition metal-modified activator-support. The transition metal-modified activator-support can comprise a solid oxide treated with an electron-withdrawing anion and impregnated with a Group VIII transition metal. Optionally, the catalyst composition can further comprise a co-catalyst, such as an organoaluminum compound. Unexpectedly, in these olefin polymerization processes, the melt index (MI) of the olefin polymer produced by the process can be at least 10% less than a MI of an olefin polymer obtained under the same polymerization conditions using an activator-support without the Group VIII transition metal.

Methods of controlling or adjusting melt flow properties and/or molecular weight parameters of an olefin polymer— for example, an ethylene-based homopolymer or copolymer—also are disclosed and described herein. In one aspect, a method for reducing a melt flow property (e.g., MI, HLMI, etc.) of an olefin polymer is provided, and in this aspect, the method can comprise (a) contacting a catalyst composition with an olefin monomer and an optional olefin comonomer in a polymerization reactor system under polymerization conditions to produce the olefin polymer, wherein the catalyst composition can comprise a metallocene compound, an activator-support (without a Group VIII transition metal), and an optional co-catalyst; and (b) introducing an amount of a transition metal-modified activator-support into the polymerization reactor system to reduce the melt flow property of the olefin polymer. The transition metal-modified activator-support can comprise a solid oxide treated with an electron-withdrawing anion and impregnated with a Group VIII transition metal.

In another aspect, a method for increasing a molecular weight parameter (e.g., Mw, Mz, etc.) of an olefin polymer is provided, and in this aspect, the method can comprise (a) contacting a catalyst composition with an olefin monomer and an optional olefin comonomer in a polymerization reactor system under polymerization conditions to produce the olefin polymer, wherein the catalyst composition can comprise a metallocene compound, an activator-support (without a Group VIII transition metal), and an optional co-catalyst; and (b) introducing an amount of a transition metal-modified activator-support into the polymerization reactor system to increase the molecular weight parameter of the olefin polymer. The transition metal-modified activator-support can comprise a solid oxide treated with an electron-withdrawing anion and impregnated with a Group VIII transition metal.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," or "characterized by," is open-ended and does not exclude additional, unrecited elements or method steps. The transitional phrase "consisting of" excludes any element, step, or ingredient not specified in the claim. The transitional phrase "consisting essentially of" limits the scope of a claim to the specified components or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. For example, a composition consisting essentially of component A can include impurities typically present in a commercially produced or commercially available sample of component A. When a claim includes different features and/or feature classes (for example, a method step, composition features, among other possibilities), the transitional terms comprising, consisting essentially of, and consisting of, apply only to the feature class to which it is utilized, and it is possible to have different transitional terms or phrases utilized with different features within a claim. For example, a method can consist of certain steps, but utilize a catalyst system comprising recited components and other non-recited components. While compositions and methods are described herein in terms of "comprising" various components or steps, the compositions and methods can also "consist essentially of" or "consist of" the various components or steps, unless stated otherwise. For example, a catalyst composition consistent with certain aspects of the present invention can comprise; alternatively, can consist essentially of; or alternatively, can consist of; (i) a metallocene compound, (ii) a transition metal-modified activator-support, and (iii) optionally, a co-catalyst.

The terms "a," "an," "the," etc., are intended to include plural alternatives, e.g., at least one, unless otherwise specified. For instance, the disclosure of "a co-catalyst" or "a metallocene compound" is meant to encompass one, or mixtures or combinations of more than one, co-catalyst or metallocene compound, respectively, unless otherwise specified.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates that the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include ethyl, phenyl, tolyl, propenyl, and the like. Similarly, a "hydrocarbylene group" refers to a group formed by removing two hydrogen atoms from a hydrocarbon, either two hydrogen atoms from one carbon atom or one hydrogen atom from each of two different carbon atoms. Therefore, in accordance with the terminology used herein, a "hydrocarbon group" refers to a generalized group formed by removing one or more hydrogen atoms (as necessary for the particular group) from a hydrocarbon. A "hydrocarbyl group," "hydrocarbylene group," and "hydrocarbon group" can be aliphatic or aromatic, acyclic or cyclic, and/or linear or branched. A "hydrocarbyl group," "hydrocarbylene group," and "hydrocarbon group" can include rings, ring systems, aromatic rings, and aromatic ring systems, which contain only carbon and hydrogen. "Hydrocarbyl groups," "hydrocarbylene groups," and "hydrocarbon groups" include, by way of example, aryl, arylene, arene groups, alkyl, alkylene, alkane groups, cycloalkyl, cycloalkylene, cycloalkane groups, aralkyl, aralkylene, and aralkane groups, respectively, among other groups as members.

The term "alkane" whenever used in this specification and claims refers to a saturated hydrocarbon compound. Other identifiers can be utilized to indicate the presence of particular groups in the alkane (e.g., halogenated alkane indicates that the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. Similarly, an "alkylene group" refers to a group formed by removing two hydrogen atoms from an alkane (either two hydrogen atoms from one carbon atom or one hydrogen atom from two different carbon atoms). An "alkane group" is a general term that refers to a group formed by removing one or more hydrogen atoms (as necessary for the particular group) from an alkane. An "alkyl group," "alkylene group," and "alkane group" can be acyclic or cyclic and/or linear or branched unless otherwise specified.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer.

In like manner, the scope of the term "polymerization" includes homopolymerization, copolymerization, terpolymerization, etc. Therefore, a copolymerization process could involve contacting one olefin monomer (e.g., ethylene) and one olefin comonomer (e.g., 1-hexene) to produce a copolymer.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "activator-support," "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The term "activator-support" is not used to imply these activator-support components are inert, and such components should not be construed as an inert component of a catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports or chemically-treated solid oxides.

The term "fluoroorgano boron compound" is used herein with its ordinary meaning to refer to neutral compounds of the form $BY_3$. The term "fluoroorgano borate compound" also has its usual meaning to refer to the monoanionic salts of a fluoroorgano boron compound of the form $[cation]^+[BY_4]^-$, where Y represents a fluorinated organic group. Materials of these types are generally and collectively referred to as "organoboron or organoborate compounds."

The term "metallocene" as used herein, describe compounds comprising at least one $\eta_1^3$ to $\eta_1^5$-cycloalkadienyl-type moiety, wherein $\eta_1^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene can be referred to simply as the "catalyst," in much the same way the term "co-catalyst" can be used herein to refer to, for example, an organoaluminum compound.

The terms "catalyst composition," "catalyst mixture," "catalyst system," and the like, do not depend upon the actual product or composition resulting from the contact or reaction of the initial components of the claimed catalyst composition/mixture/system, the nature of the active catalytic site, or the fate of the co-catalyst, the metallocene compound, any olefin monomer used to prepare a precontacted mixture, or the activator-support(s), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise contacted in some other manner.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can be selected independently from a hydrocarbyl group having 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the number-average molecular weight (Mn) of an olefin polymer produced in an aspect of this invention. By a disclosure that the Mn can be in a range from about 10,000 to about 50,000 g/mol, Applicants intend to recite that the Mn can be equal to about 10,000, about 15,000, about 20,000, about 25,000, about 30,000, about 35,000, about 40,000, about 45,000, or about 50,000 g/mol. Additionally, the Mn can be within any range from about 10,000 to about 50,000 (for example, from about 10,000 to about 25,000), and this also includes any combination of ranges between about 10,000 and about 50,000 (for example, the Mn can be in a range from about 10,000 to about 20,000, or from about 25,000 to about 45,000). Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

Disclosed herein are polymerization processes and methods directed to the use of a transition metal-modified activator-support to reduce a melt flow property (such as melt index, MI) and/or to increase a molecular weight parameter (such as weight-average molecular weight, Mw) of an olefin polymer. The transition metal-modified activator-support can comprise a solid oxide treated with an electron-withdrawing anion and impregnated with a Group VIII transition metal (such as cobalt, nickel, palladium, platinum, and the like).

Metallocene Compounds

Generally, the processes and methods disclosed herein are intended for catalyst systems containing a metallocene compound (one or more than one). The metallocene compound can comprise, for example, a transition metal from Groups III, IV, V, or VI of the Periodic Table of the Elements, or a combination of two or more transition metals. The metallocene compound can comprise chromium, titanium, zirconium, hafnium, vanadium, or a combination thereof, or can comprise titanium, zirconium, hafnium, or a combination thereof, in certain aspects. Accordingly, the metallocene compound can comprise titanium, or zirconium, or hafnium, either singly or in combination.

While not being limited thereto, the metallocene compound can comprise an unbridged metallocene compound in an aspect of this invention. For instance, the metallocene compound can comprise an unbridged zirconium or hafnium based metallocene compound and/or an unbridged zirconium and/or hafnium based dinuclear metallocene compound. In one aspect, the metallocene compound can comprise an unbridged zirconium or hafnium based metallocene compound containing two cyclopentadienyl groups, two indenyl groups, or a cyclopentadienyl and an indenyl group. In another aspect, the metallocene compound can comprise an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with aspects of the present invention are described in U.S. Pat. Nos. 7,226,886 and 7,619,047, the disclosures of which are incorporated herein by reference in their entirety.

In other aspects, the metallocene compound can comprise an unbridged zirconium and/or hafnium based dinuclear metallocene compound. For example, the metallocene compound can comprise an unbridged zirconium based homodinuclear metallocene compound, or an unbridged hafnium based homodinuclear metallocene compound, or an unbridged zirconium and/or hafnium based heterodinuclear metallocene compound (i.e., a dinuclear compound with two hafniums, or two zirconiums, or one zirconium and one hafnium). These and other suitable dinuclear compounds (bridged and unbridged) are described in U.S. Pat. Nos. 7,863,210, 7,919, 639, 8,012,900, and 8,080,681, the disclosures of which are incorporated herein by reference in their entirety.

The metallocene compound can comprise a bridged metallocene compound, e.g., with titanium, zirconium, or hafnium. Accordingly, the metallocene compound can comprise a bridged zirconium based metallocene compound with a fluorenyl group, and with no aryl groups on the bridging group, or a bridged zirconium based metallocene compound with a cyclopentadienyl group and a fluorenyl group, and with no aryl groups on the bridging group. Such bridged metallocenes, in some aspects, can contain an alkenyl substituent (e.g., a terminal alkenyl) on the bridging group and/or on a cyclopentadienyl-type group (e.g., a cyclopentadienyl group, a fluorenyl group, etc.).

In another aspect, the metallocene compound can comprise a bridged zirconium or hafnium based metallocene compound with a fluorenyl group, and an aryl group on the bridging group. Thus, the metallocene compound can comprise a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other aspects, the aryl group on the bridging group can be a phenyl group. Optionally, these bridged metallocenes can contain an alkenyl substituent (e.g., a terminal alkenyl) on the bridging group and/or on a cyclopentadienyl-type group.

Illustrative and non-limiting examples of bridged metallocene compounds (e.g., with zirconium or hafnium) that can be employed in catalyst systems consistent with aspects of the present invention are described in U.S. Pat. Nos. 7,041,617, 7,226,886, 7,517,939, and 7,619,047, the disclosures of which are incorporated herein by reference in their entirety.

In one aspect, the catalyst composition contains only one metallocene compound, while in another aspect, the catalyst composition contains two or more metallocene compounds. If two or more metallocene compounds are used, the relative amounts of each respective metallocene compound are not restricted to any particular range. For instance, if the catalyst composition contains two metallocene compounds, the weight ratio of the first metallocene catalyst component to the second metallocene catalyst component can be in a range of from about 1:100 to about 100:1, from about 1:50 to about 50:1, from about 1:20 to about 20:1, from about 1:10 to about 10:1, or from about 1:5 to about 5:1. Accordingly, suitable ranges for the weight ratio of the first metallocene catalyst component to the second metallocene catalyst component can include, but are not limited to, from about 1:4 to about 4:1, from about 1:3 to about 3:1, from about 1:2 to about 2:1, from about 1:1.5 to about 1.5:1, from about 1:1.25 to about 1.25:1, or from about 1:1.1 to about 1.1:1, and the like.

Activator-Supports

Activator-supports, often referred to as chemically-treated solid oxides, generally can comprise a solid oxide treated with an electron-withdrawing anion. Examples of such materials are disclosed in, for instance, U.S. Pat. Nos. 7,294,599 and 7,601,665, the disclosures of which are incorporated herein by reference in their entirety.

The solid oxide used to produce the activator-support can comprise oxygen and one or more elements from Groups 2, 3, 4, 5, 6, 7, 8, 9, 10, 11, 12, 13, 14, or 15 of the periodic table, or comprising oxygen and one or more elements from the lanthanide or actinide elements (see e.g., Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For instance, the solid oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Accordingly, suitable examples of solid oxide materials that can be used to form the activator-supports can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. This includes co-gels or co-precipitates of different solid oxide materials. The solid oxide can encompass oxide materials such as alumina, "mixed oxides" thereof such as silica-alumina, materials where one oxide is coated with another, as well as combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163, the disclosure of which is incorporated herein by reference in its entirety.

Accordingly, in one aspect, the solid oxide can comprise silica, alumina, silica-alumina, silica-coated alumina, aluminum phosphate, aluminophosphate, heteropolytungstate, titania, zirconia, magnesia, boria, zinc oxide, any mixed oxide thereof, or any combination thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise silica, alumina, silica-alumina, silica-coated alumina, or any mixture thereof; alternatively, silica; alternatively, alumina; alternatively, silica-alumina; or alternatively, silica-coated alumina.

The silica-alumina which can be used typically can have an alumina content from about 5 to about 95% by weight. In one aspect, the alumina content of the silica-alumina can be from about 5 to about 50%, or from about 8% to about 30%, alumina by weight. In another aspect, high alumina content silica-alumina compounds can be employed, in which the alumina content of these silica-alumina compounds typically can range from about 60% to about 90%, or from about 65% to about 80%, alumina by weight. According to yet another aspect, the solid oxide component can comprise alumina without silica, and according to another aspect, the solid oxide component can comprise silica without alumina. Moreover, as provided hereinabove, the solid oxide can comprise a silica-coated alumina. The solid oxide can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, tungstate, molybdate, and the like, or combinations thereof. Accordingly, the electron-withdrawing anion can comprises sulfate, fluoride, chloride, phosphate, or any combination thereof; alternatively, sulfate; alternatively, fluoride; alternatively, chloride; or alternatively, phosphate.

In one aspect, the electron-withdrawing anion can comprise sulfate, and the solid oxide can comprise alumina and/or silica-coated alumina. In another aspect, the electron-withdrawing anion can comprise fluoride and the solid oxide can comprise alumina and/or silica-coated alumina. In yet another aspect, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, chlorided zinc-coated alumina, molybdate-treated alumina, and the like, as well as any mixture or combination thereof. In still another aspect, the activator-support can comprise fluorided alumina, sulfated alumina, fluorided silica-alumina, sulfated silica-alumina, fluorided silica-zirconia, fluorided silica-coated alumina, sulfated silica-coated alumina, and the like, as well as any mixture or combination thereof; alternatively, sulfated alumina, fluorided silica-alumina, fluorided silica-coated alumina, or any combination thereof; alternatively, sulfated alumina; alternatively, fluorided silica-alumina; or alternatively, fluorided silica-coated alumina.

Various procedures can be followed to form the activator-supports useful in the present invention, such as described in U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, and 7,884,163, the disclosures of which are incorporated herein by reference in their entirety.

Transition Metal-Modified Activator-Supports

The transition metal-modified activator-support generally can comprise a solid oxide treated with an electron-withdrawing anion and impregnated with a Group VIII transition metal, i.e., any solid oxide disclosed herein treated with any electron-withdrawing anion disclosed herein, and impregnated with any Group VIII transition metal disclosed herein. Activator-supports comprising a solid oxide treated with an electron-withdrawing anion are disclosed hereinabove. The Group VIII transition metal can comprise cobalt, nickel, ruthenium, rhodium, palladium, osmium, iridium, platinum, and the like, or a combination of two or more Group VIII transition metals. In one aspect, the Group VIII transition metal can comprise cobalt, nickel, palladium, or platinum, or a combination thereof. In another aspect, the Group VIII transition metal can comprise cobalt. In another aspect, the Group VIII transition metal can comprise nickel. In yet another aspect, the Group VIII transition metal can comprise palladium. In still another aspect, the Group VIII transition metal can comprise platinum.

Suitable methods for impregnating an activator-support with a metal can be found in, for example, U.S. Pat. Nos. 7,294,599, 7,601,665, 7,884,163, and 8,309,485, the disclosures of which are incorporated herein by reference in their entirety. In one aspect, the transition metal-modified activator-support can be produced by a process which comprises contacting, in any order, a solid oxide, an electron-withdrawing anion source compound, and a Group VIII transition metal compound. One or more than one calcining operation can be employed at a suitable step(s) in the process. Hence, the process for producing the transition metal-modified activator-support can include a final calcining step concurrent with and/or after the contacting of all of the solid oxide, the electron-withdrawing anion source compound, and the Group VIII transition metal compound. Optionally, the process for producing the transition metal-modified activator-support can further comprise an additional calcining step prior to the final calcining step.

The Group VIII transition metal compound used to produce the transition metal-modified activator-support can be any compound which contains a transition metal from Group VIII of the periodic table and is capable of being impregnated (either the transition metal compound, or the transition metal, or both) into a solid oxide matrix. Representative transition metal compounds containing cobalt, nickel, palladium, or platinum include, but are not limited to, nickel nitrate, cobalt nitrate, nickel acetate, cobalt acetylacetonate, cobalt chloride, allylnickel, cobalt sulfate, platinum chloride, platinum acetate, palladium chloride, palladium acetate, and the like, as well as mixtures or combinations thereof.

The amount of the Group VIII transition metal compound used to prepare the transition metal-modified activator-support typically is not limited to any particular range. However, in some aspects, the weight ratio of the Group VIII transition metal to the solid oxide can be in a range from about 1:10,000 to about 1:5, or from about 1:1000 to about 1:10. In other aspects, the weight ratio of the Group VIII transition metal to the solid oxide can be in a range from about 1:500 to about 1:10, from about 1:200 to about 1:20, from about 1:100 to about 1:5, or from about 1:50 to about 1:10.

Transition metal-modified activator-supports produced in accordance with this invention (as well as activator-supports without a Group VIII transition metal) generally have surface areas ranging from about 100 to about 1000 m²/g. In some aspects, the surface area falls within a range from about 150 to about 750 m²/g, for example, from about 200 to about 600 m²/g, or from about 250 to about 500 m²/g. The pore volume of such activator-supports generally can be greater than or equal to about 0.5 mL/g, greater than or equal to about 0.7 mL/g, greater than or equal to about 1 mL/g, or greater than or equal to about 1.3 mL/g. In some aspects, the pore volume can fall within a range from about 0.8 mL/g to about 1.8 mL/g, such as, for example, from about 1 mL/g to about 1.6 mL/g. The average pore size of the transition metal-modified activator-support (or activator-support without a Group VIII transition metal) typically can be greater than or equal to about 50, about 80, about 90, or about 100 angstroms, for example, the average pore size can be within a range from about 100 to about 300 angstroms. The transition metal-modified activator-supports (or activator-supports without a Group VIII transition metal) disclosed herein often have average particle sizes ranging from about 5 microns to about 200 microns, from about 10 microns to about 200 microns, from about 25 microns to about 150 microns, from about 40 to about 120 microns, or from about 40 to about 90 microns.

Co-Catalysts

In certain aspects directed to processes and methods employing catalyst compositions containing a co-catalyst, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth. The hydrocarbyl group (or alkyl group) can be any hydrocarbyl (or alkyl) group disclosed herein. Moreover, in some aspects, the metal of the metal hydrocarbyl can be a group 1, 2, 11, 12, 13, or 14 metal; alternatively, a group 13 or 14 metal; or alternatively, a group 13 metal. Hence, in some aspects, the metal of the metal hydrocarbyl (non-halide metal hydrocarbyl or metal hydrocarbyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium or calcium; alternatively, lithium; alternatively, sodium; alternatively, potassium; alternatively, magnesium; alternatively, calcium; alternatively, zinc; alternatively, boron; alternatively, aluminum; or alternatively, tin. In some aspects, the metal hydrocarbyl or metal alkyl, with or without a halide, can comprise a lithium hydrocarbyl or alkyl, a magnesium hydrocarbyl or alkyl, a boron hydrocarbyl or alkyl, a zinc hydrocarbyl or alkyl, or an aluminum hydrocarbyl or alkyl.

In particular aspects, the co-catalyst can comprise an aluminoxane compound, an organoboron or organoborate compound, an ionizing ionic compound, an organoaluminum compound, an organozinc compound, an organomagnesium compound, or an organolithium compound, and this includes any combinations of these materials. In one aspect, the co-catalyst can comprise an organoaluminum compound. In another aspect, the co-catalyst can comprise an aluminoxane compound, an organoboron or organoborate compound, an ionizing ionic compound, an organozinc compound, an organomagnesium compound, an organolithium compound, or any combination thereof. In yet another aspect, the co-catalyst can comprise an aluminoxane compound; alternatively, an organoboron or organoborate compound; alternatively, an ionizing ionic compound; alternatively, an organozinc compound; alternatively, an organomagnesium compound; or alternatively, an organolithium compound.

Organoaluminum Compounds

In some aspects, catalyst compositions encompassed by the present invention can comprise one or more organoaluminum compounds. Such compounds can include, but are not limited to, compounds having the formula:

$$(R^Z)_3Al;$$

where each $R^Z$ independently can be an aliphatic group having from 1 to 10 carbon atoms. For example, each $R^Z$ independently can be methyl, ethyl, propyl, butyl, hexyl, or isobutyl.

Other organoaluminum compounds which can be used in catalyst compositions disclosed herein can include, but are not limited to, compounds having the formula:

$$Al(X^7)_m(X^8)_{3-m},$$

where each $X^7$ independently can be a hydrocarbyl; each $X^8$ independently can be an alkoxide or an aryloxide, a halide, or a hydride; and m can be from 1 to 3, inclusive. Hydrocarbyl is used herein to specify a hydrocarbon radical group and includes, for instance, aryl, alkyl, cycloalkyl, alkenyl, cycloalkenyl, cycloalkadienyl, alkynyl, aralkyl, aralkenyl, and aralkynyl groups.

In one aspect, each $X^7$ independently can be any hydrocarbyl having from 1 to about 18 carbon atoms disclosed herein. In another aspect of the present invention, each $X^7$ independently can be any alkyl having from 1 to 10 carbon atoms disclosed herein. For example, each $X^7$ independently can be methyl, ethyl, propyl, n-butyl, sec-butyl, isobutyl, or hexyl, and the like, in yet another aspect of the present invention.

According to one aspect of the present invention, each $X^8$ independently can be an alkoxide or an aryloxide, any one of which has from 1 to 18 carbon atoms, a halide, or a hydride. In another aspect of the present invention, each $X^8$ can be selected independently from fluorine and chlorine. Yet, in another aspect, $X^8$ can be chlorine.

In the formula, $Al(X^7)_m(X^8)_{3-m}$, m can be a number from 1 to 3, inclusive, and typically, m can be 3. The value of m is not restricted to be an integer; therefore, this formula can include sesquihalide compounds or other organoaluminum cluster compounds.

Examples of organoaluminum compounds suitable for use in accordance with the present invention can include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof.

The present invention contemplates a method of precontacting a metallocene compound (or compounds) with an organoaluminum compound and an olefin monomer to form a precontacted mixture, prior to contacting this precontacted mixture with the activator-support (or transition metal-modified activator-support) to form a catalyst composition. When the catalyst composition is prepared in this manner, typically, though not necessarily, a portion of the organoaluminum compound can be added to the precontacted mixture and another portion of the organoaluminum compound can be added to the postcontacted mixture prepared when the precontacted mixture is contacted with the solid oxide activator-support(s). However, the entire organoaluminum compound can be used to prepare the catalyst composition in either the precontacting or postcontacting step. Alternatively, all the catalyst components can be contacted in a single step.

Further, more than one organoaluminum compound can be used in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed regardless of whether a single organoaluminum compound or more than one organoaluminum compound is used.

Aluminoxane Compounds

Certain aspects of the present invention employ a catalyst composition which can comprise an aluminoxane compound. As used herein, the terms "aluminoxane" and "aluminoxane compound" refer to aluminoxane compounds, compositions, mixtures, or discrete species, regardless of how such aluminoxanes are prepared, formed or otherwise provided. For example, a catalyst composition comprising an aluminoxane compound can be prepared in which aluminoxane is provided as the poly(hydrocarbyl aluminum oxide), or in which aluminoxane is provided as the combination of an aluminum alkyl compound and a source of active protons such as water. Aluminoxanes also can be referred to as poly(hydrocarbyl aluminum oxides) or organoaluminoxanes.

The other catalyst components typically can be contacted with the aluminoxane in a saturated hydrocarbon compound solvent, though any solvent that is substantially inert to the reactants, intermediates, and products of the activation step can be used. The catalyst composition formed in this manner can be collected by any suitable method, for example, by filtration. Alternatively, the catalyst composition can be introduced into the polymerization reactor without being isolated.

The aluminoxane compound of this invention can be an oligomeric aluminum compound comprising linear structures, cyclic structures, or cage structures, or mixtures of all three. Cyclic aluminoxane compounds having the formula:

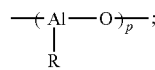

wherein each R in this formula independently can be a linear or branched alkyl having from 1 to 10 carbon atoms, and p in this formula can be an integer from 3 to 20, are encompassed by this invention. The AlRO moiety shown here also can constitute the repeating unit in a linear aluminoxane. Thus, linear aluminoxanes having the formula:

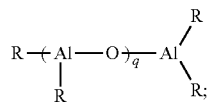

wherein each R in this formula independently can be a linear or branched alkyl having from 1 to 10 carbon atoms, and q in this formula can be an integer from 1 to 50, are also encompassed by this invention.

Further, aluminoxanes can have cage structures of the formula $R^t_{5r+\alpha}R^b_{r-\alpha}Al_{4r}O_{3r}$, wherein each $R^t$ independently can be a terminal linear or branched alkyl group having from 1 to 10 carbon atoms; each Rb independently can be a bridging linear or branched alkyl group having from 1 to 10 carbon atoms; r can be 3 or 4; and a can be equal to $n_{Al(3)}-n_{O(2)}+n_{O(4)}$, wherein $n_{Al(3)}$ is the number of three coordinate aluminum atoms, $n_{O(2)}$ is the number of two coordinate oxygen atoms, and $n_{O(4)}$ is the number of 4 coordinate oxygen atoms.

Thus, aluminoxanes which can be employed in the catalyst compositions of the present invention can be represented generally by formulas such as $(R-Al-O)_p$, $R(R-Al-O)_qAlR_2$, and the like. In these formulas, each R group independently can be a linear or branched $C_1$-$C_6$ alkyl, such as methyl, ethyl, propyl, butyl, pentyl, or hexyl. Examples of aluminoxane compounds that can be used in accordance with the present invention can include, but are not limited to, methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentyl-aluminoxane, 2-pentylaluminoxane, 3-pentylaluminoxane, isopentylaluminoxane, neopentylaluminoxane, and the like, or any combination thereof. Methylaluminoxane, ethylaluminoxane, and iso-butylaluminoxane can be prepared from trimethylaluminum, triethylaluminum, or triisobutylaluminum, respectively, and sometimes are referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as that disclosed in U.S. Pat. No. 4,794,096, incorporated herein by reference in its entirety.

The present invention contemplates many values of p and q in the aluminoxane formulas $(R—Al—O)_p$ and $R(R—Al—O)_qAlR_2$, respectively. In some aspects, p and q can be at least 3. However, depending upon how the organoaluminoxane is prepared, stored, and used, the value of p and q can vary within a single sample of aluminoxane, and such combinations of organoaluminoxanes are contemplated herein.

In preparing a catalyst composition containing an aluminoxane, the molar ratio of the total moles of aluminum in the aluminoxane (or aluminoxanes) to the total moles of metallocene complex(es) in the composition generally can be between about 1:10 and about 100,000:1. In another aspect, the molar ratio can be in a range from about 5:1 to about 15,000:1. Optionally, aluminoxane can be added to a polymerization reactor system in ranges from about 0.01 mg/L to about 1000 mg/L, from about 0.1 mg/L to about 100 mg/L, or from about 1 mg/L to about 50 mg/L.

Organoaluminoxanes can be prepared by various procedures. Examples of organoaluminoxane preparations are disclosed in U.S. Pat. Nos. 3,242,099 and 4,808,561, the disclosures of which are incorporated herein by reference in their entirety. For example, water in an inert organic solvent can be reacted with an aluminum alkyl compound, such as $(Rz)_3Al$, to form the desired organoaluminoxane compound. While not intending to be bound by this statement, it is believed that this synthetic method can afford a mixture of both linear and cyclic R—Al—O aluminoxane species, both of which are encompassed by this invention. Alternatively, organoaluminoxanes can be prepared by reacting an aluminum alkyl compound, such as $(Rz)_3Al$, with a hydrated salt, such as hydrated copper sulfate, in an inert organic solvent.

Organoboron & Organoborate Compounds

According to another aspect of the present invention, the processes and methods can utilize a catalyst composition comprising an organoboron or organoborate compound. Such compounds can include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present invention. Examples of fluoroorgano borate compounds that can be used in the present invention can include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis [3,5-bis(trifluoromethyl)phenyl]borate, triphenylcarbenium tetrakis[3,5-bis(trifluoromethyl)phenyl]borate, and the like, or mixtures thereof. Examples of fluoroorgano boron compounds that can be used as co-catalysts in the present invention can include, but are not limited to, tris(pentafluorophenyl)boron, tris[3,5-bis(trifluoromethyl)phenyl]boron, and the like, or mixtures thereof. Although not intending to be bound by the following theory, these examples of fluoroorgano borate and fluoroorgano boron compounds, and related compounds, can form "weakly-coordinating" anions when combined with a transition metal complex (see e.g., U.S. Pat. No. 5,919,983, the disclosure of which is incorporated herein by reference in its entirety). Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

Generally, any amount of organoboron compound can be used. According to one aspect of this invention, the molar ratio of the total moles of organoboron or organoborate compound (or compounds) to the total moles of metallocene compound(s) in the catalyst composition can be in a range from about 0.1:1 to about 15:1. Typically, the amount of the fluoroorgano boron or fluoroorgano borate compound used can be from about 0.5 moles to about 10 moles of boron/borate compound per mole of metallocene complex(es). According to another aspect of this invention, the amount of fluoroorgano boron or fluoroorgano borate compound can be from about 0.8 moles to about 5 moles of boron/borate compound per mole of metallocene complex(es).

Ionizing Ionic Compounds

In another aspect, processes and methods disclosed herein can utilize a catalyst composition comprising an ionizing ionic compound. An ionizing ionic compound is an ionic compound that can function as a co-catalyst to enhance the activity of the catalyst composition. While not intending to be bound by theory, it is believed that the ionizing ionic compound can be capable of reacting with a metallocene complex and converting the metallocene complex into one or more cationic metallocene complexes, or incipient cationic metallocene complexes. Again, while not intending to be bound by theory, it is believed that the ionizing ionic compound can function as an ionizing compound by completely or partially extracting an anionic ligand, such as a monoanionic ligand (e.g. chlorine, etc.), from the metallocene complex. However, the ionizing ionic compound can be a co-catalyst regardless of whether it is ionizes the metallocene compound, abstracts a ligand in a fashion as to form an ion pair, weakens the metal-ligand bond in the metallocene, simply coordinates to a ligand, or activates the metallocene by some other mechanism.

Further, it is not necessary that the ionizing ionic compound activate the metallocene compound only. The activation function of the ionizing ionic compound can be evident in the enhanced activity of catalyst composition as a whole, as compared to a catalyst composition that does not contain an ionizing ionic compound.

Examples of ionizing ionic compounds can include, but are not limited to, the following compounds: tri(n-butyl)ammonium tetrakis(p-tolyl)borate, tri(n-butyl) ammonium tetrakis (m-tolyl)borate, tri(n-butyl)ammonium tetrakis(2,4-dimethylphenyl)borate, tri(n-butyl)ammonium tetrakis(3,5-dimethylphenyl)$_b$ orate, tri(n-butyl)ammonium tetrakis [3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis [3,5-bis (trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl) borate, triphenylcarbenium tetrakis(2,4-dimethylphenyl)borate, triphenylcarbenium tetrakis(3,5-dimethylphenyl) borate, triphenylcarbenium tetrakis [3,5-bis(trifluoromethyl) phenyl]borate, triphenylcarbenium tetrakis (pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis [3,5-bis(trifluoromethyl)phenyl]borate, tropylium tetrakis(pentafluorophenyl) borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl) aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl) aluminate, potassium tetrakis(2,4-dimethylphenyl) aluminate, potassium tetrakis (3,5-dimethylphenyl) aluminate, potassium tetrafluoroaluminate, and the like, or combinations thereof. Ionizing ionic compounds useful in this invention are not limited to these; other examples of ionizing ionic compounds are disclosed in U.S. Pat. Nos. 5,576,259 and 5,807,938, the disclosures of which are incorporated herein by reference in their entirety.

Organozinc, Organomagnesium, & Organolithium Compounds

Other aspects are directed to processes and methods utilizing a catalyst composition which can include an organozinc compound, an organomagnesium compound, an organolithium compound, or a combination thereof. In some aspects, these compounds have the following general formulas:

$Zn(X^{10})(X^{11})$;

$Mg(X^{12})(X^{13})$; and $Li(X^{14})$.

In these formulas, $X^{10}$, $X^{12}$, and $X^{14}$ independently can be a $C_1$ to $C_{18}$ hydrocarbyl group, and $X^{11}$ and $X^{13}$ independently can be H, a halide, or a $C_1$ to $C_{18}$ hydrocarbyl or $C_1$ to $C_{18}$ hydrocarboxy group. It is contemplated $X^{10}$ and $X^{11}$ (or $X^{12}$ and $X^{13}$) can be the same, or that $X^{10}$ and $X^{11}$ (or $X^{12}$ and $X^{13}$) can be different.

In one aspect, $X^{10}$; $X^{11}$, $X^{12}$, $X^{13}$, and $X^{14}$ independently can be any $C_1$ to $C_{18}$ hydrocarbyl group, $C_1$ to $C_{12}$ hydrocarbyl group, $C_1$ to $C_8$ hydrocarbyl group, or $C_1$ to $C_5$ hydrocarbyl group disclosed herein. In another aspect, $X^{10}$; $X^{11}$, $X^{12}$, $X^{13}$, and $X^{14}$ independently can be any $C_1$ to $C_{18}$ alkyl group, $C_2$ to $C_{18}$ alkenyl group, $C_6$ to $C_{18}$ aryl group, or $C_7$ to $C_{18}$ aralkyl group disclosed herein; alternatively, any $C_1$ to $C_{12}$ alkyl group, $C_2$ to $C_{12}$ alkenyl group, $C_6$ to $C_{12}$ aryl group, or $C_7$ to $C_{12}$ aralkyl group disclosed herein; or alternatively, any $C_1$ to $C_5$ alkyl group, $C_2$ to $C_5$ alkenyl group, $C_6$ to $C_8$ aryl group, or $C_7$ to $C_8$ aralkyl group disclosed herein. Thus, $X^{10}$; $X^{11}$, $X^{12}$, $X^{13}$, and $X^{14}$ independently can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, an octadecyl group, an ethenyl group, a propenyl group, a butenyl group, a pentenyl group, a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, an octadecenyl group, a phenyl group, a naphthyl group, a benzyl group, or a tolyl group, and the like. In yet another aspect, $X^{10}$, $X^{11}$, $X^{12}$, $X^{13}$, and $X^{14}$ independently can be methyl, ethyl, propyl, butyl, or pentyl (e.g., neopentyl), or both $X^{10}$ and $X^{11}$ (or both $X^{12}$ and $X^{13}$) can be methyl, or ethyl, or propyl, or butyl, or pentyl (e.g., neopentyl).

$X^{11}$ and $X^{13}$ independently can be H, a halide, or a $C_1$ to $C_{18}$ hydrocarbyl or $C_1$ to $C_{18}$ hydrocarboxy group (e.g., any $C_1$ to $C_{18}$, $C_1$ to $C_{12}$, $C_1$ to $C_{10}$, or $C_1$ to $C_8$ hydrocarboxy group disclosed herein). In some aspects, $X^{11}$ and $X^{13}$ independently can be H, a halide (e.g., Cl), or a $C_1$ to $C_{18}$ hydrocarbyl or $C_1$ to $C_{18}$ hydrocarboxy group; alternatively, H, a halide, or a $C_1$ to $C_8$ hydrocarbyl or $C_1$ to $C_8$ hydrocarboxy group; or alternatively, H, Br, Cl, F, I, methyl, ethyl, propyl, butyl, pentyl (e.g., neopentyl), hexyl, heptyl, octyl, nonyl, decyl, ethenyl, propenyl, butenyl, pentenyl, hexenyl, heptenyl, octenyl, nonenyl, decenyl, phenyl, benzyl, tolyl, methoxy, ethoxy, propoxy, butoxy, pentoxy, phenoxy, toloxy, xyloxy, or benzoxy.

In other aspects, the organozinc and/or the organomagnesium compound can have one or two hydrocarbylsilyl moieties. Each hydrocarbyl of the hydrocarbylsilyl group can be any hydrocarbyl group disclosed herein (e.g., a $C_1$ to $C_{18}$ alkyl group, a $C_2$ to $C_{18}$ alkenyl group, a $C_6$ to $C_{18}$ aryl group, a $C_7$ to $C_{18}$ aralkyl group, etc.). Illustrative and non-limiting examples of hydrocarbylsilyl groups can include, but are not limited to, trimethylsilyl, triethylsilyl, tripropylsilyl (e.g., triisopropylsilyl), tributylsilyl, tripentylsilyl, triphenylsilyl, allyldimethylsilyl, trimethylsilylmethyl, and the like.

Exemplary organozinc compounds which can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl) zinc, di(triphenylsilyl)zinc, di(allyldimethylsilyl)zinc, di(trimethylsilylmethyl)zinc, and the like, or combinations thereof.

Similarly, exemplary organomagnesium compounds can include, but are not limited to, dimethylmagnesium, diethylmagnesium, dipropylmagnesium, dibutylmagnesium, dineopentylmagnesium, di(trimethylsilylmethyl)magnesium, methylmagnesium chloride, ethylmagnesium chloride, propylmagnesium chloride, butylmagnesium chloride, neopentylmagnesium chloride, trimethylsilylmethylmagnesium chloride, methylmagnesium bromide, ethylmagnesium bromide, propylmagnesium bromide, butylmagnesium bromide, neopentylmagnesium bromide, trimethylsilylmethylmagnesium bromide, methylmagnesium iodide, ethylmagnesium iodide, propylmagnesium iodide, butylmagnesium iodide, neopentylmagnesium iodide, trimethylsilylmethylmagnesium iodide, methylmagnesium ethoxide, ethylmagnesium ethoxide, propylmagnesium ethoxide, butylmagnesium ethoxide, neopentylmagnesium ethoxide, trimethylsilylmethylmagnesium ethoxide, methylmagnesium propoxide, ethylmagnesium propoxide, propylmagnesium propoxide, butylmagnesium propoxide, neopentylmagnesium propoxide, trimethylsilylmethylmagnesium propoxide, methylmagnesium phenoxide, ethylmagnesium phenoxide, propylmagnesium phenoxide, butylmagnesium phenoxide, neopentylmagnesium phenoxide, trimethylsilylmethylmagnesium phenoxide, and the like, or any combinations thereof.

Likewise, exemplary organolithium compounds can include, but are not limited to, methyllithium, ethyllithium, propyllithium, butyllithium (e.g., t-butyllithium), neopentyllithium, trimethylsilylmethyllithium, phenyllithium, tolyllithium, xylyllithium, benzyllithium, (dimethylphenyl)methyllithium, allyllithium, and the like, or combinations thereof.

Olefin Monomers

Unsaturated reactants that can be employed in the processes and methods of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (a), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can be a $C_2$-$C_{20}$ olefin; alternatively, a $C_2$-$C_{20}$ α-olefin; alternatively, a $C_2$-$C_{12}$ olefin; alternatively, a $C_2$-$C_{10}$ α-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can comprise, for example, ethylene or propylene, which is copolymerized with at least one comonomer (e.g., a $C_2$-$C_{20}$ α-olefin, a $C_3$-$C_{20}$ α-olefin, etc.). According to one aspect of this invention, the olefin monomer in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one aspect of the present invention, the comonomer can comprise an α-olefin (e.g., a $C_3$-$C_{10}$ α-olefin), while in another embodiment, the comonomer can comprise 1-butene, 1-pentene, 1-hexene, 1-octene, 1-decene, styrene, or any combination thereof. For example, the comonomer can comprise 1-butene, 1-hexene, 1-octene, or a combination thereof.

Generally, the amount of comonomer introduced into a polymerization reactor system to produce a copolymer can be from about 0.01 to about 50 weight percent of the comonomer based on the total weight of the monomer and comonomer. According to another aspect of the present invention, the amount of comonomer introduced into a polymerization reactor system can be from about 0.01 to about 40 weight percent comonomer based on the total weight of the monomer and comonomer. In still another aspect, the amount of comonomer introduced into a polymerization reactor system can be from about 0.1 to about 35 weight percent comonomer based on the total weight of the monomer and comonomer. Yet, in another aspect, the amount of comonomer introduced into a polymerization reactor system can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Catalyst Compositions

In some aspects, the present invention can employ catalyst compositions containing a metallocene compound, a transition metal-modified activator-support, and an optional co-catalyst, while in other aspects, the present invention can employ catalyst compositions containing a metallocene compound, an activator-support (without a Group VIII transition metal), and an optional co-catalyst. These catalyst compositions can be utilized to produce polyolefins—homopolymers, copolymers, and the like—for a variety of end-use applications. Transition metal-modified activator-supports and activator-supports (without a Group VIII transition metal) are discussed hereinabove. In aspects of the present invention, it is contemplated that the catalyst composition can contain more than one transition metal-modified activator-support and/or more than activator-support (without a Group VIII transition metal). Further, additional catalytic compounds—other than those specified as transition metal-modified activator-supports and activator-supports (without a Group VIII transition metal), metallocene compounds, and co-catalysts—can be employed in the catalyst compositions and/or the polymerization processes, provided that the additional catalytic compound(s) does not detract from the advantages disclosed herein.

Generally, catalyst compositions of the present invention comprise a metallocene compound, a transition metal-modified activator-support, and an optional co-catalyst, and/or a metallocene compound, an activator-support (without a Group VIII transition metal), and an optional co-catalyst. Various bridged, unbridged, and dinuclear metallocene compounds useful in the present invention are disclosed hereinabove. Optionally, such catalyst compositions can further comprise one or more than one co-catalyst compound or compounds (suitable co-catalysts, such as organoaluminum compounds, also are discussed hereinabove). Thus, a catalyst composition of this invention can comprise a metallocene compound, a transition metal-modified activator-support, and an organoaluminum compound, and/or a metallocene compound, an activator-support (without a Group VIII transition metal), and an organoaluminum compound. In some aspects, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof. In some aspects, the metallocene compound can comprise (or consist essentially of, or consist of) an unbridged zirconium or hafnium based metallocene compound; or a bridged zirconium or hafnium based metallocene compound with a fluorenyl group, and with no aryl groups on the bridging group; or a bridged zirconium or hafnium based metallocene compound with a fluorenyl group, and an aryl group on the bridging group.

In another aspect of the present invention, catalyst compositions are provided which are substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed herein below, in the absence of these additional materials. For example, a catalyst composition of the present invention can consist essentially of a metallocene compound, a transition metal-modified activator-support, and an organoaluminum compound (or a metallocene compound, an activator-support without a Group VIII transition metal, and an organoaluminum compound), wherein no other materials are present in the catalyst composition which would increase/decrease the activity of the catalyst composition by more than about 10% from the catalyst activity of the catalyst composition in the absence of said materials.

However, in other aspects of this invention, these co-catalysts can be employed. For example, a catalyst composition can contain a co-catalyst, and suitable co-catalysts in this aspect can include, but are not limited to, aluminoxane compounds, organoboron or organoborate compounds, ionizing ionic compounds, organoaluminum compounds, organozinc compounds, organomagnesium compounds, organolithium compounds, and the like, or any combination thereof; or alternatively, organoaluminum compounds, organozinc compounds, organomagnesium compounds, organolithium compounds, or any combination thereof. More than one co-catalyst can be present in the catalyst composition.

This invention further encompasses methods of making these catalyst compositions, such as, for example, by contacting the respective catalyst components in any order or sequence. Hence, in one aspect, the catalyst composition can be produced by a process comprising contacting the metallocene compound and the transition metal-modified activator-support and/or the activator-support without a Group VIII transition metal. In another aspect, the catalyst composition can be produced by a process comprising contacting, in any order, the metallocene compound, the transition metal-modified activator-support (and/or the activator-support without a Group VIII transition metal), and the co-catalyst (e.g., an organoaluminum compound).

Generally, the weight ratio of organoaluminum compound to activator-support(s) (with and/or without a Group VIII transition metal) can be in a range from about 10:1 to about 1:1000. If more than one organoaluminum compound and/or more than one activator-support are employed, this ratio is based on the total weight of each respective component. In another aspect, the weight ratio of the organoaluminum compound to the activator-support(s) can be in a range from about 3:1 to about 1:100, or from about 1:1 to about 1:50.

In some aspects of this invention, the weight ratio of metallocene compound to activator-support(s) in the catalyst composition can be in a range from about 1:1 to about 1:1,000,000. In another aspect, this weight ratio can be in a range from about 1:5 to about 1:100,000, or from about 1:10 to about 1:10,000. Yet, in another aspect, the weight ratio of the metallocene compound to the activator-supports can be in a range from about 1:20 to about 1:1000.

Catalyst compositions of the present invention generally have a catalyst activity greater than about 100 grams of polyethylene (homopolymer, copolymer, etc., as the context requires) per gram of activator-support(s) per hour (abbreviated g/g/hr). In another aspect, the catalyst activity can be greater than about 150, greater than about 250, or greater than about 500 g/g/hr. In still another aspect, catalyst compositions of this invention can be characterized by having a catalyst activity greater than about 550, greater than about 650, or greater than about 750 g/g/hr. Yet, in another aspect, the catalyst activity can be greater than about 1000 g/g/hr, greater than about 1500 g/g/hr, or greater than about 2000 g/g/hr. These activities are measured under slurry polymerization conditions using isobutane as the diluent, at a polymerization temperature of about 90° C. and a reactor pressure of about 400 psig. Moreover, such catalyst activities can be achieved when the catalyst composition contains a co-catalyst, such as an organoaluminum compound (e.g., triethylaluminum, triisobutylaluminum, etc.). Additionally, in some aspects, the solid oxide can be alumina or silica-coated alumina, and the electron-withdrawing anion can be sulfate or fluoride.

Polymerization Processes

Catalyst compositions of the present invention can be used to polymerize olefins to form homopolymers, copolymers, terpolymers, and the like. One such process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise a metallocene compound, a transition metal-modified activator-support, and an optional co-catalyst. The transition metal-modified activator-support can comprise a solid oxide treated with an electron-withdrawing anion and impregnated with a Group VIII transition metal. Unexpectedly, the melt index (MI) of the olefin polymer produced by the process can be at least 10% less than a MI of an olefin polymer obtained under the same polymerization conditions using an activator-support without the Group VIII transition metal.

Generally, the features of the processes disclosed herein (e.g., the metallocene compound, the transition metal-modified activator-support, the co-catalyst, the olefin monomer, the olefin comonomer, the polymerization conditions, the polymerization reactor system, the Group VIII transition metal, the impact on melt index, among others) are independently described herein, and these features can be combined in any combination to further describe the disclosed processes. As described herein, "same polymerization conditions" includes identical polymerization conditions (e.g., temperature, pressure, catalyst productivity, etc.) and identical materials (e.g., metallocene compound, co-catalyst, total weight of activator-support(s), etc.), with the exception of the use of the Group VIII transition metal. As an example, a catalyst system in accordance with certain aspects of the present invention can contain 100 mg of nickel impregnated fluorided silica-coated alumina A melt flow property (e.g., MI) of the olefin polymer (e.g., an ethylene copolymer) produced by the polymerization process using a catalyst system containing a metallocene compound, 100 mg of nickel impregnated fluorided silica-coated alumina, and an optional co-catalyst can be at least 10% less than the MI of an olefin polymer obtained under the same polymerization conditions with 100 mg of fluorided silica-coated alumina (without the Group VIII transition metal) in the catalyst system.

The processes disclosed herein, utilizing a catalyst composition containing the above-described transition metal-modified activator-support catalyst systems, can result in an olefin polymer having a reduced melt flow property and/or an increased molecular weight parameter, for instance, a reduced melt index (MI), a reduced high load melt index (HLMI), an increased weight-average molecular weight (Mw), etc. In some aspects, the Mw of the olefin polymer produced by the process (using a catalyst system containing a transition metal-modified activator-support) can be at least 5% greater, at least 7% greater, at least 10% greater, at least 15% greater, or at least 20% greater, than a Mw of an olefin polymer obtained under the same polymerization conditions using an activator-support without the Group VIII transition metal (i.e., using a catalyst system containing an activator-support without the transition metal). For instance, the Mw of the olefin polymer produced by the process can be from 5% to about 95% greater, from about 10% to about 90% greater, from about 10% to about 75% greater, or from about 10% to about 50% greater, than the Mw of the olefin polymer obtained under the same polymerization conditions using an activator-support without the Group VIII transition metal.

In some aspects, the MI of the olefin polymer produced by the process (using a catalyst system containing a transition metal-modified activator-support) can be at least 10% less, at least 12% less, at least 15% less, at least 20% less, at least 25% less, at least 30% less, at least 40% less, at least 50% less, or at least 60% less, than a MI of an olefin polymer obtained under the same polymerization conditions using an activator-support without the Group VIII transition metal (i.e., using a catalyst system containing an activator-support without the transition metal). For instance, the MI of the olefin polymer produced by the process can be from 10% to about 99% less, from 10% to about 95% less, from about 15% to about 99% less, from about 15% to about 95% less, from about 15% to about 90% less, from about 20% to about 90% less, from about 20% to about 80% less, or from about 25% to about 90% less, than the MI of the olefin polymer obtained under the same polymerization conditions using an activator-support without the Group VIII transition metal.

Likewise, in some aspects, the HLMI of the olefin polymer produced by the process (using a catalyst system containing a transition metal-modified activator-support) can be at least 10% less, at least 12% less, at least 15% less, at least 20% less, at least 25% less, at least 30% less, at least 40% less, at least 50% less, or at least 60% less, than a HLMI of an olefin polymer obtained under the same polymerization conditions using an activator-support without the Group VIII transition metal (i.e., using a catalyst system containing an activator-support without the transition metal). For instance, the HLMI of the olefin polymer produced by the process can be from 10% to about 99% less, from 10% to about 95% less, from about 15% to about 99% less, from about 15% to about 95% less, from about 15% to about 90% less, from about 20% to about 90% less, from about 20% to about 80% less, or from about 25% to about 90% less, than the HLMI of the olefin polymer obtained under the same polymerization conditions using an activator-support without the Group VIII transition metal.

Methods for reducing melt flow properties and/or for increasing molecular weight parameters of olefin polymers also are encompassed herein. In one aspect, a method for reducing a melt flow property (e.g., MI, HLMI) of an olefin polymer is disclosed, and in this aspect, the method can comprise (a) contacting a catalyst composition with an olefin monomer and an optional olefin comonomer in a polymerization reactor system under polymerization conditions to produce the olefin polymer, wherein the catalyst composition comprises a metallocene compound, an activator-support (without a Group VIII transition metal), and an optional co-catalyst; and (b) introducing an amount of a transition metal-modified activator-support into the polymerization reactor system to reduce the melt flow property of the olefin polymer. In another aspect, a method for increasing a molecular weight parameter (e.g., Mw, Mz, etc.) of an olefin polymer is disclosed, and in this aspect, the method can comprise (a) contacting a catalyst composition with an olefin monomer and an optional olefin comonomer in a polymerization reactor system under polymerization conditions to produce the olefin polymer, wherein the catalyst composition comprises a metallocene compound, an activator-support (without a Group VIII transition metal), and an optional co-catalyst; and (b) introducing an amount of a transition metal-modified activator-support into the polymerization reactor system to increase the molecular weight parameter of the olefin polymer. In these methods, the transition metal-modified activator-support can comprise a solid oxide treated with an electron-withdrawing anion and impregnated with a Group VIII transition metal.

Generally, the features of the methods disclosed herein (e.g., the metallocene compound, the activator-support, the Group VIII transition metal, the transition metal-modified activator-support, the co-catalyst, the olefin monomer, the olefin comonomer, the polymerization conditions, the polymerization reactor system, the melt flow property, the molecular weight parameter, among others) are independently described herein, and these features can be combined in any combination to further describe the disclosed methods.

Unexpectedly, in a method for reducing a melt flow property, the melt flow property can be MI, and the melt index can be reduced by at least 10%, at least 12%, at least 15%, at least 20%, at least 25%, at least 30%, at least 40%, or at least 50%, due to the addition of the transition metal-modified activator-support into the polymerization reactor system. For instance, the MI of the olefin polymer can be reduced by from 10% to about 99%, from 10% to about 95%, from about 15% to about 99%, from about 15% to about 95%, from about 15% to about 90%, from about 20% to about 90%, from about 20% to about 80%, or from about 25% to about 90%, due to the addition of the transition metal-modified activator-support into the polymerization reactor system.

Likewise, in a method for reducing a melt flow property, the melt flow property can be HLMI, and the high load melt index can be reduced by at least 10%, at least 12%, at least 15%, at least 20%, at least 25%, at least 30%, at least 40%, or at least 50%, due to the addition of the transition metal-modified activator-support into the polymerization reactor system. For instance, the HLMI of the olefin polymer can be reduced by from 10% to about 99%, from 10% to about 95%, from about 15% to about 99%, from about 15% to about 95%, from about 15% to about 90%, from about 20% to about 90%, from about 20% to about 80%, or from about 25% to about 90%, due to the addition of the transition metal-modified activator-support into the polymerization reactor system.

In a method for increasing a molecular weight parameter, the molecular weight parameter can be Mw, and the Mw can be increased at least 5%, at least 7%, at least 10%, at least 15%, or at least 20%, due to the addition of the transition metal-modified activator-support into the polymerization reactor system. For instance, the Mw of the olefin polymer can be increased from 5% to about 95%, from about 10% to about 90%, from about 10% to about 75%, from about 10% to about 50%, or from about 15% to about 80%, due to the addition of the transition metal-modified activator-support into the polymerization reactor system.

Likewise, in a method for increasing a molecular weight parameter, the molecular weight parameter can be Mz, and the Mz can be increased at least 5%, at least 7%, at least 10%, at least 15%, or at least 20%, due to the addition of the transition metal-modified activator-support into the polymerization reactor system. For instance, the Mz of the olefin polymer can be increased from 5% to about 95%, from about 10% to about 90%, from about 10% to about 75%, from about 10% to about 50%, or from about 15% to about 80%, due to the addition of the transition metal-modified activator-support into the polymerization reactor system.

In these methods disclosed herein, the transition metal-modified activator-support can be introduced (e.g., added, injected, etc.) into the polymerization reactor system by any suitable means, for instance, alone, or with a carrier (e.g., a carrier liquid, etc.). The transition metal-modified activator-support can be introduced into the polymerization reactor system at any suitable location within the reactor system. In one aspect, the transition metal-modified activator-support can be added directly into a polymerization reactor within the polymerization reactor system, while in another aspect, the transition metal-modified activator-support can be introduced into the polymerization reaction system at a feed or inlet location other than directly into a polymerization reactor, for example, in a recycle stream. In some aspects, the transition metal-modified activator-support can be added to the reactor with a carrier or solvent, non-limiting examples of which can include, but are not limited to isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, and the like, or combinations thereof. In particular aspects contemplated herein, the transition metal-modified activator-support can be added to the polymerization reactor system with the catalyst system.

The amount of the transition metal-modified activator-support added to the reactor system is not particularly limited, so long as the amount of the transition metal-modified activator-support added to the reactor system is sufficient to impact the melt flow property and/or the molecular weight parameter of the olefin polymer as described herein. Nonetheless, while not being limited thereto, the transition metal-modified activator-support often can be added at a weight ratio of the Group VIII transition metal (in the transition metal-modified activator-support) to the metallocene compound in a range from about 10:1 to about 1:1000. This weight ratio is based on the respective amounts of the transition metal-modified activator-support and the metallocene compound (or compounds) fed into the reactor system (e.g., into a polymerization reactor). As a non-limiting example of a 1:10 weight ratio, in a continuous polymerization reactor system, the total amount of the metallocene catalyst components fed into the reactor(s) per time interval can be "Y" lb/hr; thus, the amount of the Group VIII transition metal fed into the reactor(s) would be equal to "0.1Y" lb/hr for a 1:10 weight ratio. Suitable ranges for the weight ratio of the Group VIII transition metal (in the transition metal-modified activator-support) to the metallocene compound can include, but are not limited to, from about 5:1 to about 1:500, from about 1:1 to about 1:100, from about 1:2 to about 1:100, from about 1:10 to about 1:100, from about 10:1 to about 1:10, or from about 5:1 to about 1:5, and the like.

In an aspect, the transition metal-modified activator-support can be added into the polymerization reactor system continuously. For instance, the transition metal-modified activator-support can be added to the reactor whenever the olefin monomer or the metallocene catalyst component, or both, are added to the reactor. Alternatively, the transition metal-modified activator-support can be added periodically, on an as-needed basis, or pulsed to the reactor. Intermittent addition to a polymerization reactor is disclosed, for instance, in U.S. Pat. No. 5,739,220 and U.S. Patent Publication No. 2004/0059070, the disclosures of which are incorporated herein by reference in their entirety.

In some aspects, the addition of the transition metal-modified activator-support can be used to control, adjust, fine-tune, etc., the production and properties of a particular polymer grade, without having to change other aspects of the catalyst composition (e.g., the metallocene compound), by reducing one or more melt flow properties of the polymer and/or by increasing one or more molecular weight parameters of the polymer. Moreover, the polymerization conditions can be held substantially constant (e.g., within +/−5%), for example, for the production of a particular polymer grade. Representative polymerization conditions include temperature, pressure, residence time, production rate, co-catalyst concentration, and the like. As above, in such circumstances, the addition of the transition metal-modified activator-support can be used to control, adjust, fine-tune, etc., the melt flow and molecular weight properties of that particular polymer grade.

Optionally, if additional control parameters for the methods and processes are desired other than the use of a transition metal-modified activator-support, the methods and processes disclosed herein can further comprise a step of adjusting at least one polymerization condition (e.g., temperature, pressure, residence time, production rate, co-catalyst concentration, etc.).

In one aspect, no hydrogen is added to the polymerization reactor system. As one of ordinary skill in the art would recognize, hydrogen can be generated in-situ by the metallocene catalyst component during the olefin polymerization process. In this aspect, there is no "added hydrogen" to the reactor system.

Although not required, however, hydrogen can be added to the polymerization reactor system in certain aspects. Optionally, for instance, the methods and processes provided herein can further comprise a step of adding hydrogen to the polymerization reactor system to adjust a molecular weight parameter (e.g., Mw, Mn, Mz) of the olefin polymer, and/or to adjust a melt flow property (e.g., MI, HLMI) of the olefin polymer, if desired. Generally, the step of adding hydrogen can decrease the Mw (and/or Mn and/or Mz), and/or increase the MI (and/or HLMI) of the polymer.

In aspects where hydrogen is added to the polymerization reactor system, the hydrogen addition can be held substantially constant (e.g., within +/−20%), for example, for the production of a particular polymer grade. For instance, the ratio of hydrogen to the olefin monomer in the polymerization process can be controlled, often by the feed ratio of hydrogen to the olefin monomer entering the reactor. Further, the addition of comonomer (or comonomers) can be, and generally is, substantially constant throughout the polymerization run for a particular copolymer grade. However, in other embodiments, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

For the production of a particular grade of an olefin polymer, with certain desired melt flow properties, a target MI (and/or HLMI) of the olefin polymer can be established. Thus, when the particular polymer grade is produced, variables can be adjusted in order to achieve the targeted MI (and/or HLMI). Accordingly, in some aspects, the processes and methods provided herein optionally can further comprise the steps of determining (or measuring) the MI (and/or HLMI) of the olefin polymer, and then adjusting the amount of the transition metal-modified activator-support introduced into the polymerization reactor system based on the difference between the measured MI (and/or HLMI) and the target MI (and/or HLMI). As a representative example, if the measured MI is higher than that of the target MI for the production of a particular grade of olefin polymer, then the transition metal-modified activator-support can be added at an amount appropriate to make the measured MI equivalent to that of the target MI. For instance, the feed rate of the transition metal-modified activator-support (e.g., at the expense of the activator-support without the Group VIII transition metal) can be increased to reduce the MI of the olefin polymer.

Likewise, for the production of a particular grade of an olefin polymer, with certain desired molecular weight properties, a target Mw (and/or Mz) of the olefin polymer can be established. Thus, when the particular polymer grade is produced, variables can be adjusted in order to achieve the targeted Mw (and/or Mz). Accordingly, in some aspects, the processes and methods provided herein optionally can further comprise the steps of determining (or measuring) the Mw (and/or Mz) of the olefin polymer, and then adjusting the amount of the transition metal-modified activator-support introduced into the polymerization reactor system based on the difference between the measured Mw (and/or Mz) and the target Mw (and/or Mz). As a representative example, if the measured Mw is lower than that of the target Mw for the production of a particular grade of olefin polymer, then the transition metal-modified activator-support can be added at an amount appropriate to make the measured Mw equivalent to that of the target Mw. For instance, the feed rate of the transition metal-modified activator-support (e.g., at the expense of the activator-support without the Group VIII transition metal) can be increased to increase the Mw of the olefin polymer.

In accordance with the present invention, optionally and as-needed, various polymerization conditions or process variables can be adjusted and/or controlled during the operation of a polymerization reactor system, and such conditions or variables can include, but are not limited to, reaction temperature, reactor pressure, residence time, catalyst system flow rate into the reactor, monomer flow rate (and comonomer, if employed) into the reactor, olefin polymer output rate, recycle rate, hydrogen flow rate (if employed), reactor cooling status, slurry density, circulation pump power, and the like.

The disclosed processes and methods are intended for any olefin polymerization process using various types of polymerization reactors, polymerization reactor systems, and polymerization reaction conditions. As used herein, "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Processes can also include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one aspect of the invention, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst system, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor system can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor system can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the invention, the polymerization reactor system can comprise a solution polymerization reactor wherein the monomer (and comonomer, if used) are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactor systems suitable for the present invention can further comprise any combination of at least one raw material feed system, at least one feed system for catalyst or catalyst components, and/or at least one polymer recovery system. Suitable reactor systems for the present invention can further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can fall within a range from about 70° C. to about 100° C., or from about 75° C. to about 95° C. Various polymerization conditions can be held substantially constant, for example, for the production of a particular grade of olefin polymer.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages.

Aspects of this invention are directed to olefin polymerization processes comprising contacting a catalyst composition with an olefin monomer and an optional olefin comonomer in a polymerization reactor system under polymerization conditions to produce an olefin polymer. The olefin polymer (e.g., an ethylene copolymer) produced by the process can have any of the polymer properties disclosed herein, for example, a melt index of less than or equal to about 25 g/10 min, a density in a range from about 0.89 g/cm$^3$ to about 0.96 g/cm$^3$, a Mw in a range from about 100,000 to about 500,000 g/mol, and/or a Mn in a range from about 5,000 to about 100,000 g/mol.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers produced by any of the polymerization processes disclosed herein. Articles of manufacture can be formed from, and/or can comprise, the polymers produced in accordance with this invention.

Polymers and Articles

Olefin polymers encompassed herein can include any polymer produced from any olefin monomer and optional comonomer(s) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene copolymer, an ethylene terpolymer, a propylene terpolymer, and the like, including combinations thereof. In one aspect, the olefin polymer can be an ethylene/1-butene copolymer, an ethylene/1-hexene copolymer, or an ethylene/1-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

Polymers of ethylene (homopolymers, copolymers, terpolymers, etc.) produced in accordance with some aspects of this invention generally can have a melt index (MI, g/10 min, ASTM D1238, 190° C. and 2,160 gram weight) from 0 to about 25 g/10 min. Melt indices in the range from 0 to about 10 g/10 min, from 0 to about 5 g/10 min, from 0 to about 2 g/10 min, or from 0 to about 1 g/10 min, are contemplated in other aspects of this invention. For example, a polymer of the present invention can have a melt index in a range from about 0.01 to about 25, from about 0.1 to about 25, from about 0.5 to about 25, from about 0.1 to about 10, from about 0.1 to about 3, from about 0.5 to about 3, from about 0.5 to about 1.5, from about 0.01 to about 1 g/10 min, or from about 0.1 to about 1 g/10 min.

Moreover, ethylene-based polymers produced in accordance with some aspects of this invention generally can have a high load melt index (HLMI, g/10 min, ASTM D1238, 190° C. and 21,600 gram weight) from 0 to about 100 g/10 min. HLMI's in the range from 0 to about 80 g/10 min, from 0 to about 70 g/10 min, from 0 to about 60 g/10 min, or from 0 to about 50 g/10 min, are contemplated in other aspects of this invention. For example, a polymer of the present invention can have a HLMI in a range from about 0.1 to about 100, from about 0.1 to about 80, from about 0.5 to about 70, from about 0.5 to about 60, from about 0.5 to about 50, from about 1 to about 40, or from about 1 to about 30 g/10 min.

The densities of ethylene-based polymers produced using the catalyst systems and processes disclosed herein often are greater than or equal to about 0.89 g/cm$^3$ (ASTM D1505 and ASTM D1928, procedure C). In one aspect of this invention, the density of the ethylene polymer can be in a range from about 0.89 to about 0.96 g/cm$^3$. Yet, in another aspect, the density can be in a range from about 0.91 to about 0.96 g/cm$^3$, such as, for example, from about 0.91 to about 0.95 g/cm$^3$, from about 0.91 to about 0.94 g/cm$^3$, from about 0.92 to about 0.94 g/cm$^3$, or from about 0.92 to about 0.93 g/cm$^3$.

Ethylene polymers, such as copolymers, terpolymers, etc., consistent with various aspects of the present invention generally can have weight-average molecular weights (Mw's), for instance, in a range from about 50,000 to about 700,000 g/mol, from about 70,000 to about 700,000 g/mol, from about 100,000 to about 700,000 g/mol, from about 80,000 to about 500,000 g/mol, from about 90,000 to about 400,000 g/mol, or from about 100,000 to about 400,000 g/mol. Although not limited thereto, typical ranges of the number-average molecular weight (Mn) can include from about 5,000 to about 150,000 g/mol, from about 5,000 to about 100,000 g/mol, from about 5,000 to about 50,000 g/mol, from about 10,000 to about 100,000 g/mol, or from about 10,000 to about 40,000 g/mol.

The ratio of Mw/Mn, or the polydispersity index, for the polymers of this invention are not limited to any particular range. In some aspects, however, the ratio of Mw/Mn can be in a range from about 2 to about 40, from about 2.2 to about 35, from about 2.2 to about 30, from about 2.4 to about 30, from about 2 to about 25, from about 2.2 to about 10, from about 2.2 to about 5, from about 2 to about 4, from about 2.2 to about 3, from about 2.4 to about 3.5, or from about 10 to about 40.

Polymers of ethylene, whether homopolymers, copolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Applicants also contemplate a method for forming or preparing an article of manufacture comprising an olefin polymer produced by any of the polymerization processes and methods disclosed herein. For instance, a method can comprise (i) contacting a catalyst composition with an olefin monomer and an optional olefin comonomer in a polymerization reaction system under polymerization conditions to produce an olefin polymer, wherein the catalyst composition can comprise a metallocene compound, a transition metal-modified activator-support, and an optional co-catalyst (e.g., an organoaluminum compound); and (ii) forming an article of manufacture comprising the olefin polymer. The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight. High load melt index (HLMI, g/10 min) was determined in accordance with ASTM D1238 at 190° C. with a 21,600 gram weight.

Polymer density was determined in grams per cubic centimeter (g/cm$^3$) on a compression molded sample, cooled at about 15° C. per hour, and conditioned for about 40 hours at room temperature in accordance with ASTM D1505 and ASTM D1928, procedure C.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. The integral calibration method was used to deduce molecular weights and molecular weight distributions using a Chevron Phillips Chemicals Company's HDPE polyethylene resin, MARLEX® BHB5003, as the standard. The integral table of the standard was pre-determined in a separate experiment with SEC-MALS. Mn is the number-average molecular weight, Mw is the weight-average molecular weight, and Mz is the z-average molecular weight.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*|versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta*(\omega)| = \frac{\eta_0}{[1 + (\tau_\eta \omega)^a]^{(1-n)/a}},$$

wherein:
|η*(ω)|=magnitude of complex shear viscosity;
$\eta_0$=zero shear viscosity;
$\tau_\eta$=viscous relaxation time;
a="breadth" parameter;
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety. Melt viscosities at 0.1 sec$^{-1}$ and 100 sec$^{-1}$ (in Pa-sec) were determined using the same equipment and procedure.

The following representative bridged metallocene compound was used in the examples that follow (Me=methyl; t-Bu=tert-butyl):

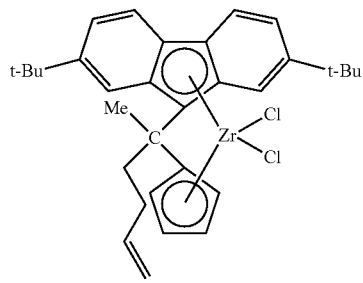

Fluorided silica-coated alumina (an activator-support without the Group VIII transition metal) was produced as follows. An alumina was obtained from W. R. Grace under the designation "Alumina A" having a surface area of about 300 m$^2$/g and a pore volume of about 1.2 mL/g. This material was obtained as a powder having an average particle size of about 90 microns. The alumina was first calcined at about 600° C. for approximately 6 hours, and then contacted with tetraethylorthosilicate in isopropanol to equal 25% SiO$_2$. After drying, the solid oxide was impregnated to incipient wetness with 10% ammonium bifluoride (based on the weight of the solid oxide) in solution in methanol. This mixture was then placed in a flat pan and allowed to dry under vacuum at approximately 110° C. for about 16 hours. To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 600° C. At this temperature, the powder was allowed to fluidize for about three hours in the dry air. Afterward, the fluorided silica-coated alumina was collected and stored under dry nitrogen.

The transition metal-modified activator-supports (i.e., with the Group VIII transition metal) were produced in substantially the same manner as the fluorided silica-coated alumina, except that the Group VIII metal was impregnated by mixing nickel nitrate (or cobalt nitrate) at 1.5 mmol per gram of solid oxide with the 10% ammonium bifluoride solution in methanol and the silica-coated alumina, followed by drying and calcining.

Examples 1-11

Examples 1-11 were produced using the following polymerization procedure. All polymerization runs were conducted in a one-gallon stainless steel reactor with 1.8 L of isobutane. A solution of the metallocene compound was prepared at about 3 mg/mL in toluene. Approximately 100 mg of the activator-support, 3 mg of the metallocene compound, and 0.4 mL of 1 M TIBA (in heptane) were added in that order through a charge port while slowly venting isobutane vapor. The charge port was closed and isobutane was added. The contents of the reactor were stirred and heated to the desired run temperature of about 90° C., and ethylene was then introduced into the reactor with hydrogen (if used). Ethylene (and hydrogen, if used) were fed on demand at the specified weight ratio to maintain the target pressure of 400 psig and the specified hydrogen pressure for the length of the polymerization run, which was varied to maintain comparable catalyst productivity or polymer production to within +/−10% of 250 grams for Examples 1-11. The reactor was maintained at the desired temperature throughout the run by an automated heating-cooling system.

Table I summarizes certain process conditions and properties of the polymers of Examples 1-11. In Table I, "transition metal" is the transition metal in the activator-support, CY-a is the Carreau-Yasuda CY-a parameter, and η is the melt viscosity at the respective shear rate. As shown in Table I, and unexpectedly, the use of a transition metal-modified silica-coated alumina, as compared to silica-coated alumina (without the Group VIII transition metal), resulted in significant reductions in the MI and the HLMI, as well as significant increases in the Mw and Mz of the polymer. The increase in polymer molecular weight via the use of the transition metal-modified silica-coated alumina was also demonstrated by the increase in melt viscosity at 0.1 sec$^{-1}$ and 100 sec$^{-1}$ (Example 2 versus Example 1, and Example 4 versus Example 3). The CY-a parameter also increased via the use of a transition metal-modified silica-coated alumina, indicating a narrowing of the relaxation time distribution, a property which can be useful in film applications.

TABLE I

Processing Conditions and Polymer Properties of Examples 1-11.

| Example | H$_2$ (psi) | Transition Metal | Mn (g/mol) | Mw (g/mol) | Mz (g/mol) | MI (g/10 min) | HLMI (g/10 min) | CY-a | η at 0.1 sec$^{-1}$ (Pa-sec) | η at 100 sec$^{-1}$ (Pa-sec) |
|---|---|---|---|---|---|---|---|---|---|---|
| 1 | 0 | None | 103,000 | 232,000 | 425,000 | 0.13 | 1.24 | 0.418 | 58,600 | 5,990 |
| 2 | 0 | Nickel | 87,000 | 276,000 | 533,000 | 0.06 | 0.39 | 0.466 | 110,500 | 7,690 |
| 3 | 100 | None | 86,000 | 217,000 | 416,000 | 0.12 | 1.13 | 0.413 | 61,600 | 5,930 |
| 4 | 100 | Nickel | 73,000 | 262,000 | 515,000 | 0.07 | 0.64 | 0.473 | 94,800 | 6,770 |
| 5 | 200 | None | 40,000 | 142,000 | 349,000 | | 15.32 | | | |
| 6 | 200 | Nickel | 48,000 | 167,000 | 403,000 | | 7.47 | | | |
| 7 | 0 | None | | | | | 1.34 | | | |
| 8 | 0 | Nickel | | | | | 0.22 | | | |
| 9 | 0 | None | | | | | 1.65 | | | |
| 10 | 0 | None | | | | | 1.16 | | | |
| 11 | 0 | Cobalt | | | | | 0.22 | | | |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1. An olefin polymerization process, the process comprising:
contacting a catalyst composition with an olefin monomer and an optional olefin comonomer in a polymerization reactor system under polymerization conditions to produce an olefin polymer, wherein the catalyst composition comprises a metallocene compound, a transition metal-modified activator-support, and an optional co-catalyst,
wherein the transition metal-modified activator-support comprises a solid oxide treated with an electron-withdrawing anion and impregnated with a Group VIII transition metal; and
wherein a melt index (MI) of the olefin polymer produced by the process is at least 10% less than a MI of an olefin polymer obtained under the same polymerization conditions using an activator-support without the Group VIII transition metal.

Embodiment 2. The process defined in embodiment 1, wherein the MI of the olefin polymer produced by the process is any percentage amount disclosed herein less than the MI of an olefin polymer obtained under the same polymerization conditions using an activator-support without the Group VIII transition metal, e.g., at least 15% less, from about 15% to about 95% less, from about 20% to about 80% less, etc.

Embodiment 3. The process defined in embodiment 1 or 2, wherein the high load melt index (HLMI) of the olefin polymer produced by the process is any percentage amount disclosed herein less than the HLMI of an olefin polymer obtained under the same polymerization conditions using an activator-support without the Group VIII transition metal, e.g., at least 10% less, at least 15% less, from about 15% to about 95% less, from about 20% to about 80% less, etc.

Embodiment 4. The process defined in any one of the preceding embodiments, wherein the weight-average molecular weight (Mw) of the olefin polymer produced by the process is any percentage amount disclosed herein greater than the Mw of an olefin polymer obtained under the same polymerization conditions using an activator-support without the Group VIII transition metal, e.g., at least 5% greater, at least 10% greater, from about 10% to about 75% greater, from about 10% to about 50% greater, etc.

Embodiment 5. A method for reducing a melt flow property (e.g., MI, HLMI) of an olefin polymer, the method comprising:
(a) contacting a catalyst composition with an olefin monomer and an optional olefin comonomer in a polymerization reactor system under polymerization conditions to produce the olefin polymer,
wherein the catalyst composition comprises a metallocene compound, an activator-support (without a Group VIII transition metal), and an optional co-catalyst; and
(b) introducing an amount of a transition metal-modified activator-support into the polymerization reactor system to reduce the melt flow property of the olefin polymer,
wherein the transition metal-modified activator-support comprises a solid oxide treated with an electron-withdrawing anion and impregnated with a Group VIII transition metal.

Embodiment 6. The method defined in embodiment 5, wherein the melt flow property is melt index, and the reduction in melt index is any percent reduction disclosed herein, e.g., at least 10%, at least 15%, from about 15% to about 95%, from about 20% to about 80%, etc.

Embodiment 7. The method defined in embodiment 5, wherein the melt flow property is high load melt index, and the reduction in high load melt index is any percent reduction disclosed herein, e.g., at least 10%, at least 15%, from about 15% to about 95%, from about 20% to about 80%, etc.

Embodiment 8. The method defined in any one of embodiments 5-7, wherein the amount of the transition metal-modified activator-support added to the polymerization reactor system is in any range of weight ratios of the Group VIII transition metal (in the transition metal-modified activator-support) to the metallocene compound disclosed herein, e.g., from about 10:1 to about 1:1000, from about 1:1 to about 1:100, from about 10:1 to about 1:10, etc.

Embodiment 9. A method for increasing a molecular weight parameter (e.g., Mw, Mz, etc.) of an olefin polymer, the method comprising:
(a) contacting a catalyst composition with an olefin monomer and an optional olefin comonomer in a polymerization reactor system under polymerization conditions to produce the olefin polymer,
wherein the catalyst composition comprises a metallocene compound, an activator-support (without a Group VIII transition metal), and an optional co-catalyst; and
(b) introducing an amount of a transition metal-modified activator-support into the polymerization reactor system to increase the molecular weight parameter of the olefin polymer, wherein the transition metal-modified activator-support comprises a solid oxide treated with an electron-withdrawing anion and impregnated with a Group VIII transition metal.

Embodiment 10. The method defined in embodiment 9, wherein the molecular weight parameter is Mw (or Mz), and the increase in Mw (or Mz) is any percent increase disclosed herein, e.g., at least 5%, at least 10%, from about 10% to about 75%, from about 10% to about 50%, etc.

Embodiment 11. The method defined in embodiment 9 or 10, wherein the amount of the transition metal-modified activator-support added to the polymerization reactor system is any range of weight ratios of the Group VIII transition metal (in the transition metal-modified activator-support) to the metallocene compound disclosed herein, e.g., from about 10:1 to about 1:1000, from about 1:1 to about 1:100, from about 10:1 to about 1:10, etc.

Embodiment 12. The method or process defined in any one of the preceding embodiments, wherein the polymerization reactor system comprises a batch reactor, a continuous reactor, a slurry reactor, a gas-phase reactor, a solution reactor, a high pressure reactor, a tubular reactor, an autoclave reactor, or a combination thereof.

Embodiment 13. The method or process defined in any one of the preceding embodiments, wherein the polymerization reactor system comprises a slurry reactor, a gas-phase reactor, a solution reactor, or a combination thereof.

Embodiment 14. The method or process defined in any one of the preceding embodiments, wherein the polymerization reactor system comprises a loop slurry reactor.

Embodiment 15. The method or process defined in any one of the preceding embodiments, wherein the polymerization reactor system comprises a single reactor.

Embodiment 16. The method or process defined in any one of the preceding embodiments, wherein the polymerization reactor system comprises 2 reactors.

Embodiment 17. The method or process defined in any one of the preceding embodiments, wherein the polymerization reactor system comprises more than 2 reactors.

Embodiment 18. The method or process defined in any one of the preceding embodiments, wherein the olefin monomer comprises a $C_2$-$C_{20}$ olefin.

Embodiment 19. The method or process defined in any one of the preceding embodiments, wherein the olefin monomer and the optional olefin comonomer independently comprise a $C_2$-$C_{20}$ alpha-olefin.

Embodiment 20. The method or process defined in any one of the preceding embodiments, wherein the olefin monomer comprises ethylene.

Embodiment 21. The method or process defined in any one of the preceding embodiments, wherein the catalyst composition is contacted with ethylene and an olefin comonomer comprising a $C_3$-$C_{10}$ alpha-olefin.

Embodiment 22. The method or process defined in any one of the preceding embodiments, wherein the catalyst composition is contacted with ethylene and an olefin comonomer comprising 1-butene, 1-hexene, 1-octene, or a mixture thereof.

Embodiment 23. The method or process defined in any one of the preceding embodiments, wherein the metallocene compound comprises chromium, vanadium, titanium, zirconium, hafnium, or a combination thereof.

Embodiment 24. The method or process defined in any one of the preceding embodiments, wherein the metallocene compound comprises titanium, zirconium, hafnium, or a combination thereof.

Embodiment 25. The method or process defined in any one of the preceding embodiments, wherein the metallocene compound comprises any metallocene compound disclosed herein.

Embodiment 26. The method or process defined in any one of embodiments 1-25, wherein the metallocene compound comprises an unbridged zirconium or hafnium based metallocene compound and/or an unbridged zirconium and/or hafnium based dinuclear metallocene compound.

Embodiment 27. The method or process defined in any one of embodiments 1-25, wherein the metallocene compound comprises an unbridged zirconium or hafnium based metallocene compound containing two cyclopentadienyl groups, two indenyl groups, or a cyclopentadienyl and an indenyl group.

Embodiment 28. The method or process defined in any one of embodiments 1-25, wherein the metallocene compound comprises an unbridged zirconium based metallocene compound containing two cyclopentadienyl groups, two indenyl groups, or a cyclopentadienyl and an indenyl group.

Embodiment 29. The method or process defined in any one of embodiments 1-25, wherein the metallocene compound comprises an unbridged zirconium based homodinuclear metallocene compound.

Embodiment 30. The method or process defined in any one of embodiments 1-25, wherein the metallocene compound comprises an unbridged hafnium based homodinuclear metallocene compound.

Embodiment 31. The method or process defined in any one of embodiments 1-25, wherein the metallocene compound comprises an unbridged zirconium and/or hafnium based heterodinuclear metallocene compound.

Embodiment 32. The method or process defined in any one of embodiments 1-25, wherein the metallocene compound comprises a bridged zirconium based metallocene compound with a fluorenyl group, and with no aryl groups on the bridging group.

Embodiment 33. The method or process defined in any one of embodiments 1-25, wherein the metallocene compound comprises a bridged zirconium based metallocene compound with a cyclopentadienyl group and a fluorenyl group, and with no aryl groups on the bridging group.

Embodiment 34. The method or process defined in any one of embodiments 1-25, wherein the metallocene compound comprises a bridged zirconium or hafnium based metallocene compound with a fluorenyl group, and an aryl group on the bridging group.

Embodiment 35. The method or process defined in any one of embodiments 1-25, wherein the metallocene compound comprises a bridged zirconium or hafnium based metallocene compound with a cyclopentadienyl group and fluorenyl group, and an aryl group on the bridging group.

Embodiment 36. The method or process defined in any one of embodiments 1-25, wherein the metallocene compound comprises a bridged zirconium based metallocene compound with a fluorenyl group, and an aryl group on the bridging group.

Embodiment 37. The method or process defined in any one of embodiments 1-25, wherein the metallocene compound comprises a bridged hafnium based metallocene compound with a fluorenyl group, and an aryl group on the bridging group.

Embodiment 38. The method or process defined in any one of embodiments 34-37, wherein the aryl group is a phenyl group.

Embodiment 39. The method or process defined in any one of the preceding embodiments, wherein the solid oxide comprises any solid oxide disclosed herein, e.g., silica, alumina, silica-alumina, silica-coated alumina, aluminum phosphate, aluminophosphate, heteropolytungstate, titania, zirconia, magnesia, boria, zinc oxide, etc., as well as any mixed oxide thereof or any mixture thereof.

Embodiment 40. The method or process defined in any one of the preceding embodiments, wherein the solid oxide comprises silica, alumina, silica-alumina, silica-coated alumina, or any mixture thereof.

Embodiment 41. The method or process defined in any one of the preceding embodiments, wherein the electron-withdrawing anion comprises any electron withdrawing anion disclosed herein, e.g., sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, etc., as well as any combination thereof.

Embodiment 42. The method or process defined in any one of the preceding embodiments, wherein the electron-withdrawing anion comprises sulfate, fluoride, chloride, phosphate, or any combination thereof.

Embodiment 43. The method or process defined in any one of embodiments 1-42, wherein the electron-withdrawing anion comprises sulfate and the solid oxide comprises alumina and/or silica-coated alumina Embodiment 44. The method or process defined in any one of embodiments 1-42, wherein the electron-withdrawing anion comprises fluoride and the solid oxide comprises alumina and/or silica-coated alumina.

Embodiment 45. The method or process defined in any one of the preceding embodiments, wherein the Group VIII transition metal comprises any Group VIII transition metal disclosed herein, e.g., cobalt, nickel, palladium, platinum, etc., as well as combinations thereof.

Embodiment 46. The method or process defined in any one of embodiments 1-45, wherein the Group VIII transition metal comprises cobalt.

Embodiment 47. The method or process defined in any one of embodiments 1-45, wherein the Group VIII transition metal comprises nickel.

Embodiment 48. The method or process defined in any one of embodiments 1-45, wherein the Group VIII transition metal comprises palladium. Embodiment 49. The method or process defined in any one of embodiments 1-45, wherein the Group VIII transition metal comprises platinum.

Embodiment 50. The method or process defined in any one of the preceding embodiments, wherein the transition metal-modified activator-support is produced by a process comprising contacting, in any order, any solid oxide, any electron-withdrawing anion source compound, and any Group VIII transition metal compound disclosed herein.

Embodiment 51. The method or process defined in embodiment 50, wherein the process for producing the transition metal-modified activator-support further comprises a final calcining step concurrent with and/or after the contacting of all of the solid oxide, the electron-withdrawing anion source compound, and the Group VIII transition metal compound.

Embodiment 52. The method or process defined in embodiment 51, wherein the process for producing the transition metal-modified activator-support further comprises an additional calcining step prior to the final calcining step.

Embodiment 53. The method or process defined in any one of the preceding embodiments, wherein the activator-support (i.e., without the Group VIII transition metal) comprises a solid oxide treated with an electron-withdrawing anion, e.g., any solid oxide and any electron-withdrawing anion disclosed herein.

Embodiment 54. The method or process defined in any one of the preceding embodiments, wherein the activator-support (i.e., without the Group VIII transition metal) comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 55. The method or process defined in any one of the preceding embodiments, wherein the activator-support (i.e., without the Group VIII transition metal) comprises fluorided alumina, sulfated alumina, fluorided silica-alumina, sulfated silica-alumina, fluorided silica-zirconia, fluorided silica-coated alumina, sulfated silica-coated alumina, or any combination thereof.

Embodiment 56. The method or process defined in any one of the preceding embodiments, wherein the activator-support (i.e., without the Group VIII transition metal) comprises sulfated alumina, fluorided silica-alumina, fluorided silica-coated alumina, or any combination thereof.

Embodiment 57. The method or process defined in any one of embodiments 1-56, wherein the catalyst composition comprises only one metallocene compound.

Embodiment 58. The method or process defined in any one of embodiments 1-56, wherein the catalyst composition comprises two or more metallocene compounds.

Embodiment 59. The method or process defined in any one of embodiments 1-56, wherein the catalyst composition comprises two metallocene compounds at any weight ratio disclosed herein, e.g., from about 20:1 to about 1:20, from about 2:1 to about 1:2, etc.

Embodiment 60. The method or process defined in any one of the preceding embodiments, wherein the catalyst composition comprises a co-catalyst.

Embodiment 61. The method or process defined in any one of the preceding embodiments, wherein the co-catalyst comprises any co-catalyst disclosed herein, e.g., any aluminoxane compound, any organoboron or organoborate compound, any ionizing ionic compound, any organoaluminum compound, any organozinc compound, any organomagnesium compound, or any organolithium compound disclosed herein, as well as any combination thereof.

Embodiment 62. The method or process defined in any one of the preceding embodiments, wherein the co-catalyst comprises any organoaluminum compound disclosed herein.

Embodiment 63. The method or process defined in any one of the preceding embodiments, wherein the co-catalyst comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 64. The method or process defined in any one of the preceding embodiments, wherein the catalyst composition is substantially free of aluminoxane compounds, organoboron or organoborate compounds, ionizing ionic compounds, or combinations thereof.

Embodiment 65. The method or process defined in any one of the preceding embodiments, wherein the catalyst composition is produced by a process comprising contacting the metallocene compound and the transition metal-modified activator-support (and/or the activator-support without a Group VIII transition metal).

Embodiment 66. The method or process defined in any one of the preceding embodiments, wherein the catalyst composition is produced by a process comprising contacting, in any order, the metallocene compound, the transition metal-modified activator-support (and/or the activator-support without a Group VIII transition metal), and the co-catalyst.

Embodiment 67. The method or process defined in any one of the preceding embodiments, wherein the weight ratio of the Group VIII transition metal to the solid oxide is in any range of weight ratios disclosed herein, e.g., from about 1:10,000 to about 1:5, from about 1:1000 to about 1:10, from about 1:100 to about 1:5, etc.

Embodiment 68. The method or process defined in any one of the preceding embodiments, wherein the olefin polymer comprises any olefin polymer disclosed herein.

Embodiment 69. The method or process defined in any one of the preceding embodiments, wherein the olefin polymer is an ethylene/1-butene copolymer, an ethylene/1-hexene copolymer, or an ethylene/1-octene copolymer.

Embodiment 70. The method or process defined in any one of the preceding embodiments, wherein the olefin polymer is an ethylene/1-hexene copolymer.

Embodiment 71. The method or process defined in any one of the preceding embodiments, wherein the melt index (MI) of the olefin polymer in step (b) and/or the melt index of the olefin polymer produced by the process is in any range disclosed herein, e.g., from 0 to about 5 g/10 min, from about 0 to about 2 g/10 min, from about 0.01 to about 1 g/10 min, etc.

Embodiment 72. The method or process defined in any one of the preceding embodiments, wherein the high load melt index (HLMI) of the olefin polymer in step (b) and/or the high load melt index (HLMI) of the olefin polymer produced by the process is in any range disclosed herein, e.g., from 0 to about 100 g/10 min, from about 0.1 to about 80 g/10 min, from about 0.5 to about 50 g/10 min, etc.

Embodiment 73. The method or process defined in any one of the preceding embodiments, wherein the number-average molecular weight (Mn) of the olefin polymer in step (b) and/or the number-average molecular weight (Mn) of the olefin polymer produced by the process is in any range disclosed herein, e.g., from about 5,000 to about 100,000 g/mol, from about 5,000 to about 50,000 g/mol, from about 10,000 to about 40,000 g/mol, etc.

Embodiment 74. The method or process defined in any one of the preceding embodiments, wherein the weight-average molecular weight (Mw) of the olefin polymer in step (b) and/or the weight-average molecular weight (Mw) of the olefin polymer produced by the process is in any range disclosed herein, e.g., from about 100,000 to about 700,000 g/mol, from about 80,000 to about 500,000 g/mol, from about 100,000 to about 400,000 g/mol, etc.

Embodiment 75. The method or process defined in any one of the preceding embodiments, wherein the density of the olefin polymer in step (b) and/or the density of the olefin polymer produced by the process is in any range disclosed herein, e.g., from about 0.89 to about 0.96 $g/cm^3$, from about 0.91 to about 0.95 $g/cm^3$, from about 0.91 to about 0.94 $g/cm^3$, etc.

Embodiment 76. The method or process defined in any one of the preceding embodiments, wherein the polymerization conditions comprise a polymerization reaction temperature in a range from about 60° C. to about 120° C. and a reaction pressure in a range from about 200 to about 1000 psig (about 1.4 to about 6.9 MPa).

Embodiment 77. The method or process defined in any one of embodiments 1-76, wherein the polymerization conditions are substantially constant, e.g., for a particular polymer grade.

Embodiment 78. The method or process defined in any one of embodiments 1-76, further comprising a step of adjusting at least one polymerization condition, e.g., temperature, pressure, residence time, hydrogen addition, production rate, co-catalyst concentration, etc.

Embodiment 79. The method or process defined in any one of embodiments 1-78, wherein no hydrogen is added to the polymerization reactor system.

Embodiment 80. The method or process defined in any one of embodiments 1-78, wherein hydrogen is added to the polymerization reactor system, and the hydrogen addition is substantially constant, e.g., for a particular polymer grade.

Embodiment 81. The method or process defined in any one of embodiments 1-78, further comprising a step of adding hydrogen to the polymerization reactor system to adjust the melt flow property (e.g., MI, HLMI) of the olefin polymer.

Embodiment 82. The method or process defined in any one of embodiments 1-78, further comprising a step of adding hydrogen to the polymerization reactor system to adjust the molecular weight parameter (e.g., Mn, Mw, Mz) of the olefin polymer.

Embodiment 83. The method or process defined in any one of embodiments 80-82, wherein the step of adding hydrogen decreases the Mw, decreases the Mn, decreases the Mz, increases the MI, and/or increases the HLMI of the olefin polymer.

Embodiment 84. The method or process defined in any one of embodiments 5-83, further comprising the steps of determining (or measuring) the melt flow parameter (e.g., MI, HLMI); and adjusting the amount of the transition metal-modified activator-support introduced into the polymerization reactor system based on the difference between the measured melt flow parameter and a target melt flow parameter.

Embodiment 85. The method or process defined in any one of embodiments 9-83, further comprising the steps of determining (or measuring) the molecular weight parameter (e.g., Mn, Mw, Mz); and adjusting the amount of the transition metal-modified activator-support introduced into the polymerization reactor system based on the difference between the measured molecular weight parameter and a target molecular weight parameter.

Embodiment 86. The method or process defined in any one of embodiments 5-85, wherein the transition metal-modified activator-support is introduced into the polymerization reactor system continuously.

Embodiment 87. The method or process defined in any one of embodiments 5-85, wherein the transition metal-modified activator-support is introduced into the polymerization reactor system periodically.

Embodiment 88. An olefin polymer produced by the method or process defined in any one of the preceding embodiments.

Embodiment 89. An article comprising the olefin polymer defined in embodiment 88.

Embodiment 90. A method for forming or preparing an article of manufacture comprising an olefin polymer, the method comprising (i) performing the method or process defined in any one of embodiments 1-87 to produce the olefin polymer, and (ii) forming the article of manufacture comprising the olefin polymer, e.g., via any technique disclosed herein.

Embodiment 91. The article defined in embodiment 89 or 90, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. A method for reducing a melt flow property of an olefin polymer, the method comprising:
   (a) contacting a catalyst composition with an olefin monomer and an optional olefin comonomer in a polymerization reactor system under polymerization conditions to produce the olefin polymer,
   wherein the catalyst composition comprises a metallocene compound, an activator-support, and an optional co-catalyst; and
   (b) introducing an amount of a transition metal-modified activator-support into the polymerization reactor system to reduce the melt flow property of the olefin polymer,
   wherein the transition metal-modified activator-support comprises a solid oxide treated with an electron-withdrawing anion and impregnated with a Group VIII transition metal, and wherein the electron-withdrawing anion comprises sulfate and/or fluoride.

2. The method of claim 1, wherein:
   the melt flow property is melt index, and the reduction in melt index of the olefin polymer is at least 10%;
   the melt flow property is high load melt index, and the reduction in high load melt index of the olefin polymer is at least 10%; or
   both.

3. The method of claim 1, wherein:
   the melt flow property is melt index, and the reduction in melt index of the olefin polymer is from about 15% to about 95%;
   the melt flow property is high load melt index, and the reduction in high load melt index of the olefin polymer is from about 15% to about 95%; or
   both.

4. The method of claim 1, wherein the activator-support comprises fluorided alumina, sulfated alumina, fluorided silica-alumina, sulfated silica-alumina, fluorided silica-zirconia, sulfated silica-zirconia, fluorided silica-titania, fluorided silica-coated alumina, sulfated silica-coated alumina, or any combination thereof.

5. The method of claim 1, wherein the transition metal-modified activator-support comprises:
   a solid oxide comprising silica, alumina, silica-alumina, silica-coated alumina, or any mixture thereof;
   an electron-withdrawing anion comprising sulfate and/or fluoride; and impregnated with
   a Group VIII transition metal comprising cobalt, nickel, palladium, platinum, or a combination thereof.

6. The method of claim 1, wherein the catalyst composition comprises a co-catalyst, the co-catalyst comprising an aluminoxane compound, an organoboron or organoborate compound, an ionizing ionic compound, an organoaluminum compound, an organozinc compound, an organomagnesium compound, an organolithium compound, or any combination thereof.

7. The method of claim 6, wherein the co-catalyst comprises an organoaluminum compound, the organoaluminum compound comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

8. The method of claim 1, wherein the catalyst composition is contacted with ethylene and an olefin comonomer comprising 1-butene, 1-hexene, 1-octene, or a mixture thereof.

9. The method of claim 1, wherein the amount of the transition metal-modified activator-support added to the polymerization reactor system is in a range of the weight ratio of the Group VIII transition metal to the metallocene compound from about 10:1 to about 1:1000.

10. The method of claim 1, wherein a range of the weight ratio of the Group VIII transition metal to the solid oxide is from about 1:1000 to about 1:10.

11. The method of claim 1, wherein the polymerization reactor system comprises a slurry reactor, gas-phase reactor, solution reactor, or any combination thereof.

12. A method for increasing a molecular weight parameter of an olefin polymer, the method comprising:
   (a) contacting a catalyst composition with an olefin monomer and an optional olefin comonomer in a polymerization reactor system under polymerization conditions to produce the olefin polymer,
   wherein the catalyst composition comprises a metallocene compound, an activator-support, and an optional co-catalyst; and
   (b) introducing an amount of a transition metal-modified activator-support into the polymerization reactor system to increase the molecular weight parameter of the olefin polymer,
   wherein the transition metal-modified activator-support comprises a solid oxide treated with an electron-withdrawing anion and impregnated with a Group VIII transition metal, and wherein the electron-withdrawing anion comprises sulfate and/or fluoride.

13. The method of claim 12, wherein:
   the molecular weight parameter is weight-average molecular weight (Mw), and the increase in Mw of the olefin polymer is at least 5%;
   the molecular weight parameter is z-average molecular weight (Mz), and the increase in Mz of the olefin polymer is at least 5%; or
   both.

14. The method of claim 13, wherein:
   the catalyst composition is contacted with ethylene and an olefin comonomer comprising a $C_3$-$C_{10}$ alpha-olefin;
   the Group VIII transition metal comprises cobalt, nickel, palladium, platinum, or a combination thereof.

15. An olefin polymerization process, the process comprising contacting a catalyst composition with an olefin monomer and an optional olefin comonomer in a polymerization reactor system under polymerization conditions to produce an olefin polymer, wherein the catalyst composition comprises a metallocene compound, a transition metal-modified activator-support, and an optional co-catalyst,
   wherein the transition metal-modified activator-support comprises a solid oxide treated with an electron-withdrawing anion and impregnated with a Group VIII transition metal, and wherein the electron-withdrawing anion comprises sulfate and/or fluoride; and
   wherein a melt index (MI) of the olefin polymer produced by the process is at least 10% less than a MI of an olefin polymer obtained under the same polymerization conditions using an activator-support without the Group VIII transition metal.

16. The process of claim 15, wherein:
   a HLMI of the olefin polymer produced by the process is from 10% to about 95% less than a HLMI of an olefin polymer obtained under the same polymerization conditions using an activator-support without the Group VIII transition metal;
   a Mw of the olefin polymer produced by the process is at least 5% greater than a Mw of an olefin polymer obtained under the same polymerization conditions using an activator-support without the Group VIII transition metal;

the MI of the olefin polymer produced by the process is from 15% to about 90% less than the MI of an olefin polymer obtained under the same polymerization conditions using an activator-support without the Group VIII transition metal; or any combination thereof.

17. The process of claim 16, wherein:

the catalyst composition is contacted with ethylene and an olefin comonomer comprising a $C_3$-$C_{10}$ alpha-olefin;

the catalyst composition comprises a co-catalyst;

the Group VIII transition metal comprises cobalt, nickel, palladium, platinum, or a combination thereof; and the polymerization reactor system comprises a slurry reactor, gas-phase reactor, solution reactor, or any combination thereof.

18. The process of claim 17, wherein:

the catalyst composition comprises an organoaluminum compound;

the solid oxide comprises silica, alumina, silica-alumina, silica-coated alumina, or a combination thereof; and a range of the weight ratio of the Group VIII transition metal to the solid oxide is from about 1:1000 to about 1:10.

19. The process of claim 16, wherein:

the polymerization reactor system comprises a loop slurry reactor; and the olefin polymer is an ethylene/1-butene copolymer, an ethylene/1-hexene copolymer, or an ethylene/1-octene copolymer.

20. The process of claim 19, wherein the olefin polymer has:

a melt index in a range from 0 to about 5 g/10 min;

a density in a range from about 0.89 g/cm$^3$ to about 0.96 g/cm$^3$; and a Mw in a range from about 100,000 to about 700,000 g/mol.

21. The process of claim 15, wherein:

the catalyst composition is contacted with ethylene and an olefin comonomer comprising a $C_3$-$C_{10}$ alpha-olefin;

the catalyst composition comprises a co-catalyst;

the Group VIII transition metal comprises cobalt, nickel, palladium, platinum, or a combination thereof; and the polymerization reactor system comprises a slurry reactor, gas-phase reactor, solution reactor, or any combination thereof.

22. The process of claim 21, wherein:

a HLMI of the olefin polymer produced by the process is from 10% to about 95% less than a HLMI of an olefin polymer obtained under the same polymerization conditions using an activator-support without the Group VIII transition metal;

the MI of the olefin polymer produced by the process is from 15% to about 95% less than the MI of an olefin polymer obtained under the same polymerization conditions using an activator-support without the Group VIII transition metal; or both.

23. The process of claim 22, wherein:

the olefin comonomer comprises 1-butene, 1-hexene, 1-octene, or a mixture thereof;

the Group VIII transition metal comprises cobalt, nickel, or a combination thereof and the solid oxide comprises silica, alumina, silica-alumina, silica-coated alumina, or a combination thereof.

24. The process of claim 23, wherein:

the metallocene compound comprises an unbridged zirconium or hafnium based metallocene compound containing two cyclopentadienyl groups, two indenyl groups, or a cyclopentadienyl and an indenyl group;

the co-catalyst comprises an organoaluminum compound; and the solid oxide comprises alumina, silica-coated alumina, or a combination thereof.

25. The process of claim 23, wherein:

the metallocene compound comprises a bridged zirconium or hafnium based metallocene compound with a cyclopentadienyl group and a fluorenyl group;

the co-catalyst comprises an organoaluminum compound; and the solid oxide comprises alumina, silica-coated alumina, or a combination thereof.

26. The process of claim 23, wherein the electron-withdrawing anion comprises sulfate.

27. The process of claim 26, wherein a range of the weight ratio of the Group VIII transition metal to the solid oxide is from about 1:1000 to about 1:10.

* * * * *